(12) United States Patent
Suzuki et al.

(10) Patent No.: US 12,403,907 B2
(45) Date of Patent: Sep. 2, 2025

(54) AUTONOMOUS DRIVING SYSTEM, VEHICLE CONTROL INTERFACE, AND VEHICLE

(71) Applicant: TOYOTA JIDOSHA KABUSHIKI KAISHA, Toyota (JP)

(72) Inventors: Ikuma Suzuki, Okazaki (JP); Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 17/946,623

(22) Filed: Sep. 16, 2022

(65) Prior Publication Data

US 2023/0110317 A1 Apr. 13, 2023

(30) Foreign Application Priority Data

Sep. 28, 2021 (JP) ................. 2021-157678

(51) Int. Cl.
*B60W 30/18* (2012.01)
*B60W 60/00* (2020.01)

(52) U.S. Cl.
CPC .... *B60W 30/18054* (2013.01); *B60W 60/001* (2020.02); *B60W 2710/18* (2013.01); *B60W 2720/106* (2013.01)

(58) Field of Classification Search
CPC ......... B60W 30/18054; B60W 60/001; B60W 2710/18; B60W 2720/106; B60W 2710/188; B60W 2520/04; B60W 30/18027; B60W 30/18109; B60T 2201/022; B60T 2201/10; B60T 2270/402; B60T 7/22; B60T 13/662
See application file for complete search history.

(56) References Cited

U.S. PATENT DOCUMENTS

| | | | |
|---|---|---|---|
| 12,139,122 B2 * | 11/2024 | Matsuzaki | B60T 8/172 |
| 2016/0355165 A1 * | 12/2016 | Forster | B60T 1/005 |
| 2018/0065638 A1 * | 3/2018 | Kawahara | B60W 10/184 |
| 2018/0354521 A1 * | 12/2018 | Tasaka | B60W 10/18 |
| 2019/0084569 A1 * | 3/2019 | Shibata | B60W 10/184 |
| 2019/0118817 A1 * | 4/2019 | Crepin | B62D 15/0285 |
| 2019/0248349 A1 * | 8/2019 | Wulf | B60W 10/184 |
| 2019/0375388 A1 * | 12/2019 | Meister | B60T 8/885 |
| 2020/0070795 A1 * | 3/2020 | Van Thiel | B60T 13/662 |
| 2020/0101956 A1 * | 4/2020 | Suzuki | B60T 7/122 |
| 2020/0141456 A1 * | 5/2020 | Zenzen | B60T 11/10 |
| 2020/0290613 A1 * | 9/2020 | Trainor | B60W 30/18009 |

(Continued)

FOREIGN PATENT DOCUMENTS

| | | |
|---|---|---|
| JP | 2018-132015 A | 8/2018 |
| JP | 2021-123139 A | 8/2021 |

*Primary Examiner* — Sze-Hon Kong
(74) *Attorney, Agent, or Firm* — Oliff PLC

(57) ABSTRACT

A VP includes an EPB system configured to switch between activation and release of brakehold and a VCIB that interfaces between an ADS and a VP. The VCIB is configured to provide a standstill status signal to the ADS. The standstill status signal includes a value applied indicating activation of brakehold and a value released indicating release of brakehold. The ADS includes a compute assembly. When the compute assembly requests the VP to activate brakehold, it requests the VP to decelerate until the standstill status signal switches from the value released to the value applied.

7 Claims, 15 Drawing Sheets

(56) References Cited

U.S. PATENT DOCUMENTS

| | | | |
|---|---|---|---|
| 2020/0398843 A1* | 12/2020 | Sabbatini | B60W 30/18118 |
| 2021/0171000 A1* | 6/2021 | Hesseler | B60T 8/172 |
| 2021/0179057 A1* | 6/2021 | Shingai | B60T 7/22 |
| 2021/0179087 A1* | 6/2021 | Tsujino | G08G 1/144 |
| 2021/0179174 A1* | 6/2021 | Shingai | B60T 17/221 |
| 2021/0237722 A1 | 8/2021 | Suzuki et al. | |
| 2022/0176944 A1* | 6/2022 | Frashure | B60T 13/662 |
| 2022/0363276 A1* | 11/2022 | Wulf | B60W 30/18163 |
| 2023/0294650 A1* | 9/2023 | Brenn | B60T 8/885 303/3 |
| 2024/0017701 A1* | 1/2024 | van Thiel | B60T 7/12 |

* cited by examiner

FIG.3

<Standstill Command>

| Value | Description | Remarks |
|---|---|---|
| 0 | No Request | |
| 1 | Applied | Brakeholding function is allowed. |
| 2 | Released | |

FIG.4

<Standstill Status Signal>

| Value | Description | Remarks |
|---|---|---|
| 0 | Released | |
| 1 | Applied | |
| 2 | Reserved | |
| 3 | Invalid value | |

FIG.5

<Traveling Direction Signal>

| Value | Description | Remarks |
|---|---|---|
| 0 | Forward | |
| 1 | Reverse | |
| 2 | Standstill | |
| 3 | Undefined | |

FIG.12

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: : EXECUTION OF AN API WITH THE VALUE | THE ADS EXECUTES AN API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN TO WHICH THE VEHICLE BEHAVIOR IS REFLECTED |

AUTONOMOUS DRIVING SYSTEM, VEHICLE CONTROL INTERFACE, AND VEHICLE

This nonprovisional application is based on Japanese Patent Application No. 2021-157678 filed with the Japan Patent Office on Sep. 28, 2021, the entire contents of which are hereby incorporated by reference.

BACKGROUND

Field

The present disclosure relates to an autonomous driving system, a vehicle control interface, and a vehicle.

Description of the Background Art

A technique for autonomous driving of a vehicle has recently been developed. For example, Japanese Patent Laying-Open No. 2018-132015 discloses an autonomous driving system that controls autonomous driving of a vehicle in a centralized manner. This autonomous driving system includes a camera, a laser apparatus, a radar apparatus, an operation apparatus, a gradient sensor, an autonomous driving device, and an autonomous driving electronic control unit (ECU).

SUMMARY

The autonomous driving system may externally be attached to a vehicle main body. In this case, autonomous driving is realized by control of a vehicle by a vehicle platform (which will be described later) in accordance with a control request from the autonomous driving system. During autonomous driving, the vehicle is required to safely be brought to a standstill.

For appropriate coordination between the autonomous driving system and the vehicle platform, an appropriate interface is desirably provided between the autonomous driving system and the vehicle platform. Importance of such an interface may particularly be noticeable when a developer of the autonomous driving system is different from a developer of the vehicle platform.

The present disclosure was made to solve the problem above, and one of objects of the present disclosure is to safely bring a vehicle to a standstill during autonomous driving by providing an appropriate interface between an autonomous driving system and a vehicle platform.

(1) An autonomous driving system (ADS) according to one aspect of the present disclosure is mountable on a vehicle. The vehicle includes a vehicle platform (VP) that controls the vehicle in accordance with a control request from the ADS. The VP includes an electric parking brake system that switches between activation and release of brakehold and a vehicle control interface that interfaces between the ADS and the VP. The vehicle control interface provides a standstill status signal to the ADS. The standstill status signal includes a value applied indicating activation of the brakehold and a value released indicating release of the brakehold. The ADS includes a compute assembly and a communication module that communicates with the vehicle control interface. When the compute assembly requests the VP to activate the brakehold, the compute assembly requests the VP to decelerate until the standstill status signal switches from the value released to the value applied.

(2) After the standstill status signal switches to the value applied, the compute assembly continues to request the VP to decelerate also during a period for which the brakehold is active.

(3) When the standstill status signal has been set to the value applied, the compute assembly causes the VP to switch the standstill status signal from the value applied to the value released by requesting the VP to accelerate.

(4) A vehicle according to another aspect of the present disclosure includes the ADS described above.

(5) A vehicle control interface according to yet another aspect of the present disclosure interfaces between an autonomous driving system (ADS) and a vehicle platform (VP) that controls a vehicle in accordance with a control request from the ADS. The VP includes an electric parking brake system that switches between activation and release of brakehold. The vehicle control interface includes a processor and a memory in which a program executable by the processor is stored. The processor provides with the ADS, a standstill status signal including a value applied indicating activation of the brakehold and a value released indicating release of the brakehold. The processor receives a deceleration request from the ADS also after the vehicle comes to a standstill, until the standstill status signal is switched from the value released to the value applied.

(6) After the standstill status signal switches to the value applied, the processor continues to receive a request for deceleration from the ADS also during a period for which the brakehold is active.

(7) When the standstill status signal has been set to the value applied, the processor switches the standstill status signal from the value applied to the value released in response to an acceleration request from the ADS.

(8) When a standstill command provided from the ADS to the VP is a prescribed value applied, the VP activates a function to switch the brakehold.

(9) A vehicle according to yet another aspect of the present disclosure includes the vehicle control interface described above.

(10) The vehicle further includes the ADS described above.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram for illustrating a standstill command.

FIG. 4 is a diagram for illustrating a standstill status signal.

FIG. 5 is a diagram for illustrating a traveling direction signal.

FIG. 12 is a diagram showing a typical workflow in the ADS.

DESCRIPTION OF THE PREFERRED EMBODIMENTS

Figure 1:
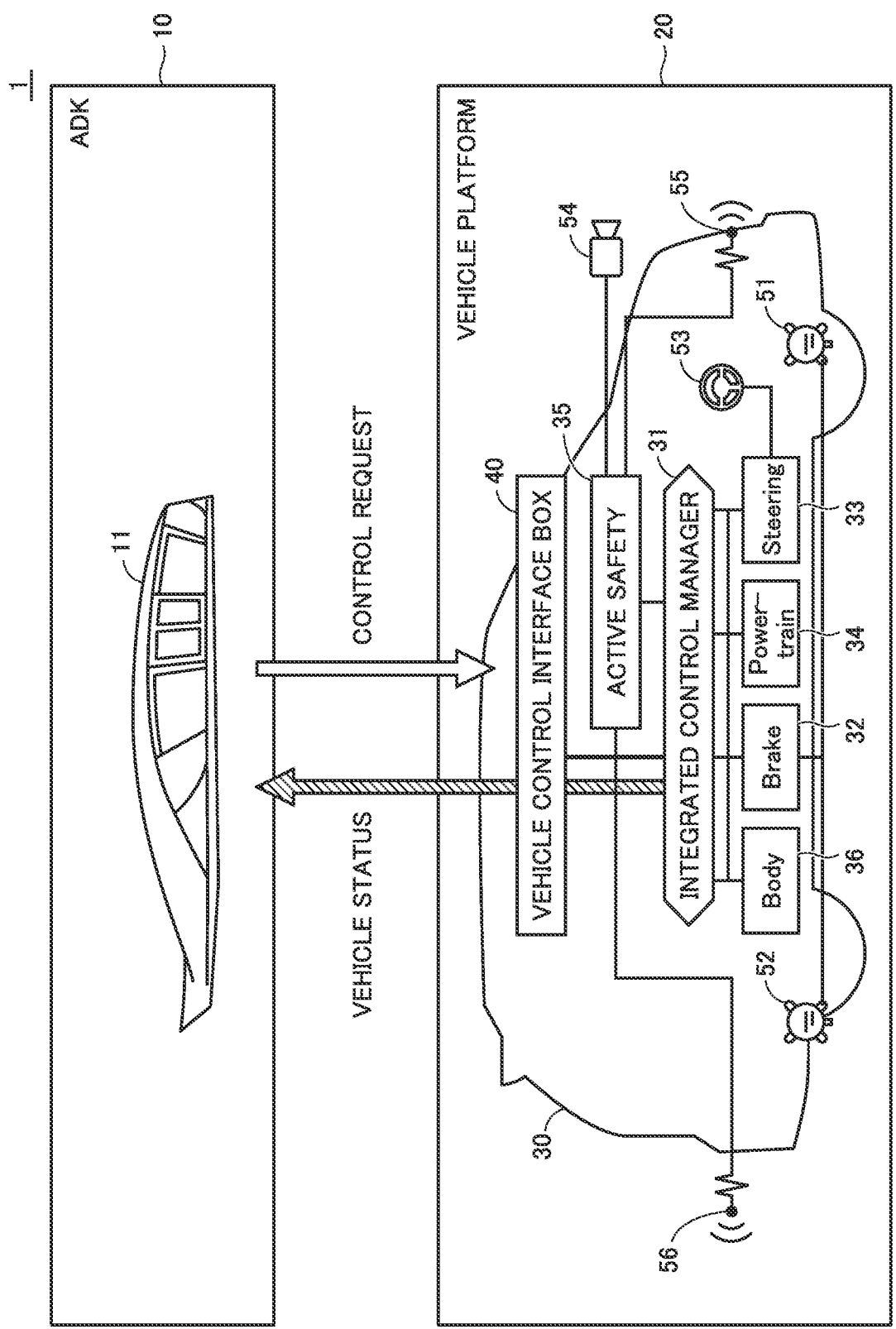
FIG. 1 is a diagram showing overview of a vehicle according to an embodiment of the present disclosure.

An embodiment of the present disclosure will be described below in detail with reference to the drawings. The same or corresponding elements in the drawings have the same reference characters allotted and description thereof will not be repeated.

Embodiment

<Overall Configuration>

FIG. 1 is a diagram showing overview of a vehicle according to an embodiment of the present disclosure. A vehicle 1 includes an autonomous driving kit (ADK) 10 and a vehicle platform (VP) 20. ADK 10 is configured as being attachable to VP 20 (mountable on vehicle 1). ADK 10 and VP 20 are configured to communicate with each other through a vehicle control interface (a VCIB 40 which will be described later).

VP 20 can carry out autonomous driving in accordance with control requests from ADK 10. Though FIG. 1 shows ADK 10 at a position distant from VP 20, ADK 10 is actually attached to a rooftop or the like of VP 20. ADK 10 can also be removed from VP 20. While ADK 10 is not attached, VP 20 carries out travel control (travel control in accordance with an operation by a user) in a manual mode.

ADK 10 includes an autonomous driving system (ADS) 11 for autonomous driving of vehicle 1. For example, ADS 11 creates a driving plan of vehicle 1. ADS 11 outputs various control requests for travel of vehicle 1 in accordance with the driving plan to VP 20 in accordance with an application program interface (API) defined for each control request. ADS 11 receives various signals indicating vehicle statuses (statuses of VP 20) from VP 20 in accordance with the API defined for each signal. Then, ADS 11 has the vehicle status reflected on the driving plan. A detailed configuration of ADS 11 will be described with reference to FIG. 2.

VP 20 includes a base vehicle 30 and a vehicle control interface box (VCIB) 40.

Base vehicle 30 carries out various types of vehicle control in accordance with a control request from ADK 10 (ADS 11). Base vehicle 30 includes various systems and various sensors for controlling base vehicle 30. More specifically, base vehicle 30 includes an integrated control manager 31, a brake system 32, a steering system 33, a powertrain system 34, an active safety system 35, a body system 36, wheel speed sensors 51 and 52, a pinion angle sensor 53, a camera 54, and radar sensors 55 and 56.

Integrated control manager 31 includes a processor and a memory, and integrally controls the systems (brake system 32, steering system 33, powertrain system 34, active safety system 35, and body system 36) involved with operations of vehicle 1.

Brake system 32 is configured to control a braking apparatus provided in each wheel of base vehicle 30. The braking apparatus includes, for example, a disc brake system (not shown) that is operated with a hydraulic pressure regulated by an actuator.

Wheel speed sensors 51 and 52 are connected to brake system 32. Wheel speed sensor 51 detects a rotation speed of a front wheel of base vehicle 30 and outputs the detected rotation speed of the front wheel to brake system 32. Wheel speed sensor 52 detects a rotation speed of a rear wheel of base vehicle 30 and outputs the detected rotation speed of the rear wheel to brake system 32. Brake system 32 outputs to VCIB 40, the rotation speed of each wheel as one of pieces of information included in the vehicle statuses. Brake system 32 generates a braking command to a braking apparatus in accordance with a prescribed control request outputted from ADS 11 through VCIB 40 and integrated control manager 31. Brake system 32 controls the braking apparatus based on the generated braking command. Integrated control manager 31 can calculate a speed of vehicle 1 (vehicle speed) based on the rotation speed of each wheel.

Steering system 33 is configured to control a steering angle of a steering wheel of vehicle 1 with a steering apparatus. The steering apparatus includes, for example, rack-and-pinion electric power steering (EPS) that allows adjustment of a steering angle by an actuator.

Pinion angle sensor 53 is connected to steering system 33. Pinion angle sensor 53 detects an angle of rotation of a pinion gear (a pinion angle) coupled to a rotation shaft of the actuator and outputs the detected pinion angle to steering system 33. Steering system 33 outputs to VCIB 40, the pinion angle as one of pieces of information included in the vehicle statuses. Steering system 33 generates a steering command to the steering apparatus in accordance with a prescribed control request outputted from ADS 11 through VCIB 40 and integrated control manager 31. Steering system 33 controls the steering apparatus based on the generated steering command.

Powertrain system 34 controls an electric parking brake (EPB) system 341 provided in at least one of a plurality of wheels, a parking lock (P-Lock) system 342 provided in a transmission of vehicle 1, and a propulsion system 343 including a shift apparatus (not shown) configured to allow selection of a shift range. A further detailed configuration of powertrain system 34 will be described with reference to FIG. 2.

Active safety system 35 detects an obstacle (a pedestrian, a bicycle, a parked vehicle, a utility pole, or the like) in front or in the rear with the use of camera 54 and radar sensors 55 and 56. Active safety system 35 determines whether or not vehicle 1 may collide with the obstacle based on a distance between vehicle 1 and the obstacle and a direction of movement of vehicle 1. When active safety system 35 determines that there is possibility of collision, it outputs a braking command to brake system 32 through integrated control manager 31 so as to increase braking force.

Body system 36 is configured to control, for example, components such as a direction indicator, a horn, and a wiper (none of which is shown), depending on a state of travel or an environment around vehicle 1. Body system 36 controls each component in accordance with a prescribed control request outputted from ADS 11 through VCIB 40 and integrated control manager 31.

VCIB 40 is configured to communicate with ADS 11 over a controller area network (CAN). VCIB 40 receives various control requests from ADS 11 or outputs a vehicle status to ADS 11 by executing a prescribed API defined for each signal. When VCIB 40 receives the control request from ADK 202, it outputs a control command corresponding to the control request to a system corresponding to the control command through integrated control manager 31. VCIB 40 obtains various types of information on base vehicle 30 from various systems through integrated control manager 31 and outputs the status of base vehicle 30 as the vehicle status to ADS 11.

Vehicle 1 may be used as one of constituent elements of a mobility as a service (MaaS) system. The MaaS system includes, for example, a data server and a mobility service platform (MSPF) (neither of which is shown), in addition to vehicle 1.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF.

Vehicle 1 further includes a data communication module (DCM) (not shown) capable of wirelessly communicating with a data server. The DCM outputs vehicle information such as a speed, a position, or an autonomous driving state to the data server. The DCM receives from the autonomous driving related mobility services through the MSPF and the data server, various types of data for management of travel of an autonomous driving vehicle including vehicle 1 in the mobility services.

The MSPF publishes APIs for using various types of data on vehicle statuses and vehicle control necessary for development of ADS 11. Various mobility services can use various functions provided by the MSPF depending on service contents, by using the APIs published on the MSPF. For example, the autonomous driving related mobility services can obtain operation control data of vehicle 1 or information stored in the data server from the MSPF by using the APIs published on the MSPF. The autonomous driving related mobility services can transmit data for managing an autonomous driving vehicle including vehicle 1 to the MSPF by using the API.

<Detailed Configuration>

Figure 2:
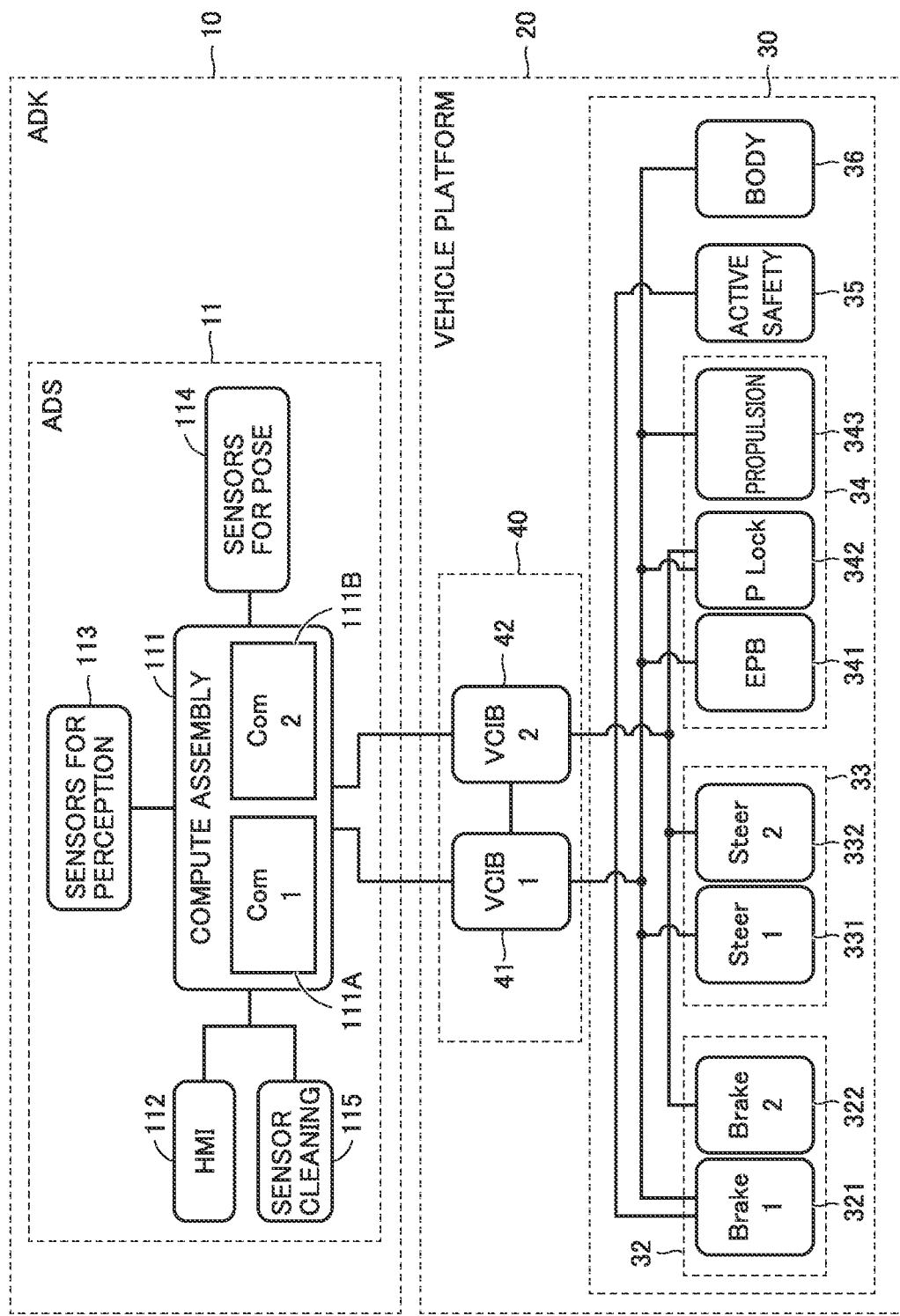
FIG. 2 is a diagram showing in further detail, a configuration of an ADS, a VCIB, and a VP.

FIG. 2 is a diagram showing in further detail, a configuration of ADS 11, VCIB 40, and VP 20. As shown in FIG. 2, ADS 11 includes a compute assembly 111, a human machine interface (HMI) 112, sensors for perception 113, sensors for pose 114, and a sensor cleaning 115.

During autonomous driving of vehicle 1, compute assembly 111 obtains information indicating an environment around vehicle 1 and information indicating a pose, a behavior, and a position of vehicle 1 from various sensors (which will be described later), and obtains a vehicle status from VP 20 through VCIB 40 and sets a next operation (acceleration, deceleration, or turning) of vehicle 1. Compute assembly 111 outputs various commands for realizing a next operation to VCIB 40. Compute assembly 111 includes communication modules 111A and 111B. Communication modules 111A and 111B are each configured to communicate with VCIB 40.

HMI 112 presents information to a user and accepts an operation by the user during autonomous driving, during driving requiring an operation by the user, or at the time of transition between autonomous driving and driving requiring an operation by the user. HMI 112 is constructed to be connected to an input and output apparatus (not shown) such as a touch panel display provided in base vehicle 30.

Sensors for perception 113 are sensors that perceive an environment around vehicle 1. Sensors for perception 113 include, for example, at least one of laser imaging detection and ranging (LIDAR), a millimeter-wave radar, and a camera (none of which is shown). The LIDAR measures a distance and a direction to an object, for example, by emitting laser beams of infrared pulses and detecting laser beams reflected by the object. The millimeter-wave radar measures a distance and a direction to an object by emitting millimeter waves and detecting millimeter waves reflected by the object. The camera is arranged, for example, on a rear side of a room mirror and shoots an image of the front of vehicle 1.

Sensors for pose 114 are sensors that detect a pose, a behavior, or a position of vehicle 1. Sensors for pose 114 include, for example, an inertial measurement unit (IMU) and a global positioning system (GPS) (neither of which is shown). The IMU detects, for example, an acceleration in a front-rear direction, a lateral direction, and a vertical direction of vehicle 1 and an angular speed in a roll direction, a pitch direction, and a yaw direction of vehicle 1. The GPS detects a position of vehicle 1 based on information received from a plurality of GPS satellites that orbit the Earth.

Sensor cleaning 115 is configured to remove with a cleaning solution or a wiper, soiling attached to various sensors (a lens of the camera or a portion from which laser beams are emitted) during traveling of vehicle 1.

VCIB 40 includes a VCIB 41 and a VCIB 42. Each of VCIBs 41 and 42 includes a processor such as a central processing unit (CPU) and a memory such as a read only memory (ROM) and a random access memory (RAM), although none of them is shown. A program executable by the processor is stored in the memory. VCIB 41 and communication module 111A are communicatively connected to each other. VCIB 42 and communication module 111B are communicatively connected to each other. VCIB 41 and VCIB 42 are communicatively connected to each other.

VCIBs 41 and 42 each relay control requests and vehicle information between ADS 11 and VP 20. More specifically, VCIB 41 generates a control command from a control request from ADS 11 with the use of an API. For example, a control command corresponding to a control request supplied from ADS 11 to VCIB 40 includes a propulsion direction command requesting switching of the shift range, an immobilization command requesting activation/deactivation of EPB system 341 and P-Lock system 342, an acceleration command requesting acceleration or deceleration of vehicle 1, a wheel steer angle command requesting a wheel steer angle of a steering wheel, and an autonomization command requesting switching between an autonomous mode and a manual mode. Then, VCIB 41 outputs the generated control command to a corresponding system of a plurality of systems included in VP 20. VCIB 41 generates information indicating a vehicle status from the vehicle information from each system of VP 20 with the use of the API. The information indicating the vehicle status may be information identical to the vehicle information or may be information extracted from the vehicle information to be used for processing performed by ADS 11. VCIB 41 provides the generated information indicating the vehicle status to ADS 11. This is also applicable to VCIB 42.

Brake system 32 includes brake systems 321 and 322. Steering system 33 includes steering systems 331 and 332. Powertrain system 34 includes EPB system 341, P-Lock system 342, and propulsion system 343.

Though VCIB 41 and VCIB 42 are basically equivalent in function to each other, they are partially different in systems connected to the VCIBs that are included in VP 20. Specifically, VCIB 41, brake system 321, steering system 331, EPB system 341, P-Lock system 342, propulsion system 343, and body system 36 are communicatively connected to one another through a communication bus. VCIB 42, brake system 322, steering system 332, and P-Lock system 342 are communicatively connected to one another through a communication bus.

As VCIBs 41 and 42 equivalent in function relating to an operation of at least one of (for example, braking or steering) systems are thus included in VCIB 40, control systems between ADS 11 and VP 20 are redundant. Thus, when some kind of failure occurs in the system, the function of VP 20 can be maintained by switching between the control systems as appropriate or disconnection of a control system where failure has occurred.

Brake systems 321 and 322 are each configured to control a braking apparatus. Brake system 321 generates a braking command to the braking apparatus in accordance with a control request outputted from ADS 11 through VCIB 41. Brake system 322 generates a braking command to the braking apparatus in accordance with a control request outputted from ADS 11 through VCIB 42. Brake system 321 and brake system 322 may be equivalent in function to each other. Alternatively, one of brake systems 321 and 322 may be configured to independently control braking force of each wheel and the other thereof may be configured to control braking force such that equal braking force is generated in the wheels. For example, brake systems 321 and 322 may control the braking apparatus based on a braking command generated by any one of them, and when a failure occurs in that brake system, they may control the braking apparatus based on a braking command generated by the other of them.

Steering systems 331 and 332 are each configured to control a steering angle of a steering wheel of vehicle 1 with a steering apparatus. Steering system 331 generates a steering command to the steering apparatus in accordance with a control request outputted from ADS 11 through VCIB 41. Steering system 332 generates a steering command to the steering apparatus in accordance with a control request outputted from ADS 11 through VCIB 42. Steering system 331 and steering system 332 may be equivalent in function to each other. Alternatively, steering systems 331 and 332 may control the steering apparatus based on the steering command generated by any one of them, and when a failure occurs in that steering system, they may control the steering apparatus based on a steering command generated by the other of them.

EPB system 341 controls the EPB in accordance with a control request outputted from ADS 11 through VCIB 41. The EPB is provided separately from the braking apparatus (a disc brake system or the like), and fixes a wheel by an operation of an actuator. The EPB, for example, activates with an actuator, a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 321 and 322.

In the present embodiment, EPB system 341 performs a brakeholding function, and is configured to switch between activation and release of brakehold. The brakeholding function of EPB system 341 will be described in detail with reference to FIGS. 3 to 5.

P-Lock system 342 controls a P-Lock apparatus in accordance with a control request outputted from ADS 11 through VCIB 41. For example, when the control request includes a control request to set the shift range to a parking range (P range), P-Lock system 342 activates the P-Lock apparatus, and when the control request includes a control request to set the shift range to a shift range other than the P range, it deactivates the P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of vehicle 1. Rotation of an output shaft of the transmission is thus fixed and the wheel is fixed.

Propulsion system 343 switches the shift range of the shift apparatus and controls driving force from a drive source (a motor generator and an engine) in accordance with a control request outputted from ADS 11 through VCIB 41. The shift ranges include, for example, a neutral range (N range), a forward travel range (D range), and a rearward travel range (R range) in addition to the P range.

Active safety system 35 is communicatively connected to brake system 321. As described previously, active safety system 35 detects an obstacle in front by using camera 54 and/or radar sensor 55, and when it determines that there is possibility of collision, it outputs a braking command to brake system 321 so as to increase braking force.

Body system 36 controls components such as a direction indicator, a horn, or a wiper in accordance with a control request outputted from ADS 11 through VCIB 41.

For example, when an autonomous mode is selected by an operation by the user onto HMI 112 in vehicle 1, autonomous driving is carried out. During autonomous driving, ADS 11 initially creates a driving plan as described previously. Examples of the driving plan include a plan to continue straight travel, a plan to turn left/right at a prescribed intersection on a predetermined travel path, and a plan to change a travel lane. ADS 11 calculates a controllable physical quantity (an acceleration, a deceleration, and a wheel steer angle) necessary for operations of vehicle 1 in accordance with the created driving plan. ADS 11 splits the physical quantity for each execution cycle time of the API. ADS 11 outputs a control request representing the split physical quantity to VCIB 40 by means of the API. Furthermore, ADS 11 obtains a vehicle status (an actual direction of movement of vehicle 1 and a state of fixation of the vehicle) from VP 20 and creates again the driving plan on which the obtained vehicle status is reflected. ADS 11 thus allows autonomous driving of vehicle 1.

<Brakehold>

A standstill sequence of vehicle 1 relating to brakehold of EPB system 341 will be described in succession. Various commands and signals used at the time of application/release of brakehold will initially be described.

FIG. 3 is a diagram for illustrating a standstill command (Standstill Command). The standstill command is provided from ADS 11 to VP 20. The standstill command can be used only while the autonomous mode has been selected.

The standstill command takes any one value of 0, 1, and 2. When the standstill command has the value 0, the standstill command represents that ADS 11 does not request VP 20 to apply/release brakehold (in other words, keep/cancel the standstill). When the standstill command has the value 1, the standstill command represents that ADS 11 requests VP 20 to apply brakehold (the brakeholding function is allowed). When the standstill command has the value 2, the standstill command represents that ADS 11 requests VP 20 to release brakehold.

FIG. 4 is a diagram for illustrating a standstill status signal (Standstill Status). The standstill status signal is provided from VP 20 to ADS 11.

The standstill status signal takes any one value from 0 to 3. When the standstill status signal has the value 0, the standstill status signal represents that the standstill of vehicle 1 has been released (vehicle 1 is not in the standstill). When the standstill status signal has the value 1, the standstill status signal represents that the standstill of vehicle 1 has been applied (vehicle 1 is in the standstill). The standstill status signal=0 means a value released (released). The standstill status signal=1 means a value applied (applied). The standstill status signal=2 means a reserved value. The standstill status signal=3 means an invalid value.

FIG. 5 is a diagram for illustrating a traveling direction signal (Traveling Direction). The traveling direction signal is provided from VP 20 to ADS 11.

The traveling direction signal takes any one value from 0 to 3. When the traveling direction signal has the value 0, the traveling direction signal represents forward travel of vehicle 1. When the traveling direction signal has the value 1, the traveling direction signal represents rearward travel of vehicle 1. When the traveling direction signal has the value 2, the traveling direction signal represents that vehicle 1 is in the standstill. The traveling direction signal=3 is undefined. The traveling direction signal is set to "standstill" (value=2) when a vehicle velocity is zero (0) for a certain period of time.

Figure 6:
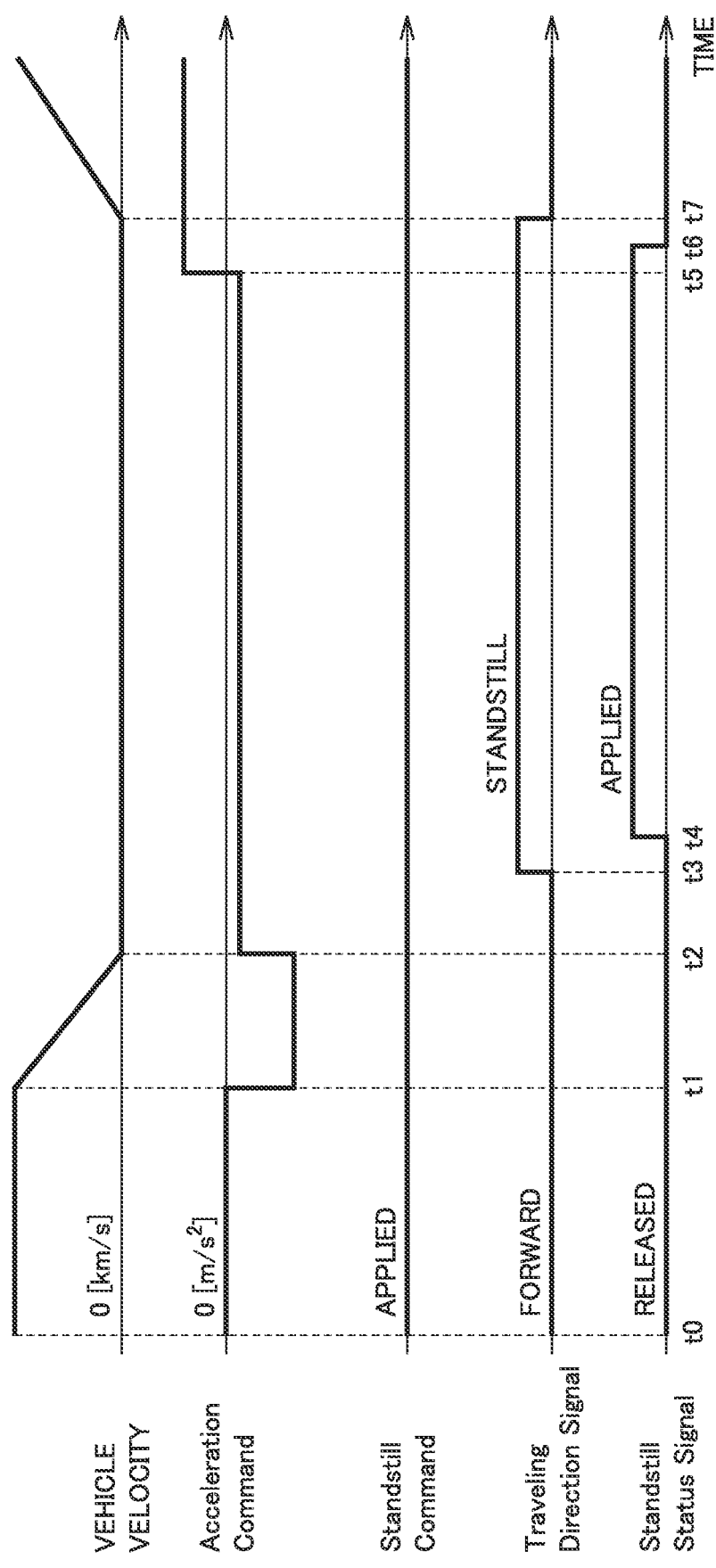
FIG. 6 is a time chart showing control relating to brakehold of the vehicle.

FIG. 6 is a time chart showing control relating to brakehold of vehicle 1. In FIG. 6, the abscissa represents elapsed time. The ordinate represents a vehicle velocity, an acceleration command, a standstill command, a traveling direction signal, and a standstill status signal sequentially from the top.

Control for activating brakehold will initially be described. In an example shown in FIG. 6, the vehicle velocity has a positive value at initial time t0. The traveling direction signal represents forward travel of vehicle 1. The acceleration command has been set to 0. The standstill command represents "applied", that is, a request for application of brakehold. The standstill status signal represents "released", that is, vehicle 1 not being in the standstill.

At time t1, the acceleration command is set to a value (a negative value) representing a request for deceleration, and the vehicle velocity starts to lower. At time t2, vehicle 1 comes to the standstill. ADS 11 continues to request vehicle 1 to decelerate by setting the acceleration command to the negative value also thereafter. At time t3 after lapse of a certain time period since vehicle 1 came to the standstill (time t2), the traveling direction signal switches from "forward" to "standstill". At subsequent time t4, the standstill status signal switches from "released" to "applied". ADS 11 can thus know that brakehold is active.

As vehicle 1 comes to the standstill (lowering to the vehicle velocity=0), the deceleration command may be set to 0 to stop the deceleration request to vehicle 1. In that case, however, vehicle 1 may move for a short period from stop of the deceleration request until actual activation of brakehold. In the present embodiment, the acceleration command is always set to the negative value also after vehicle 1 came to the standstill (that is, a period from time t2 at which the vehicle velocity is set to 0 until time t4 at which the standstill status signal switches to "applied") and the request for deceleration of vehicle 1 is continued. Thus, vehicle 1 can be maintained in the standstill status also during a period until activation of brakehold more reliably than in setting of the acceleration command to 0. Therefore, according to the present embodiment, vehicle 1 can safely be brought to the standstill in the autonomous mode.

In succession, control for releasing brakehold will be described. At time t5, the acceleration command switches from the negative value to a positive value and acceleration of vehicle 1 is requested. At time t6, the standstill status signal switches from "applied" to "released". ADS 11 can thus know that brakehold has been released. At subsequent time t7, the vehicle velocity starts to increase and the traveling direction signal switches from "standstill" to "forward".

<Process Flow>

Figure 7:
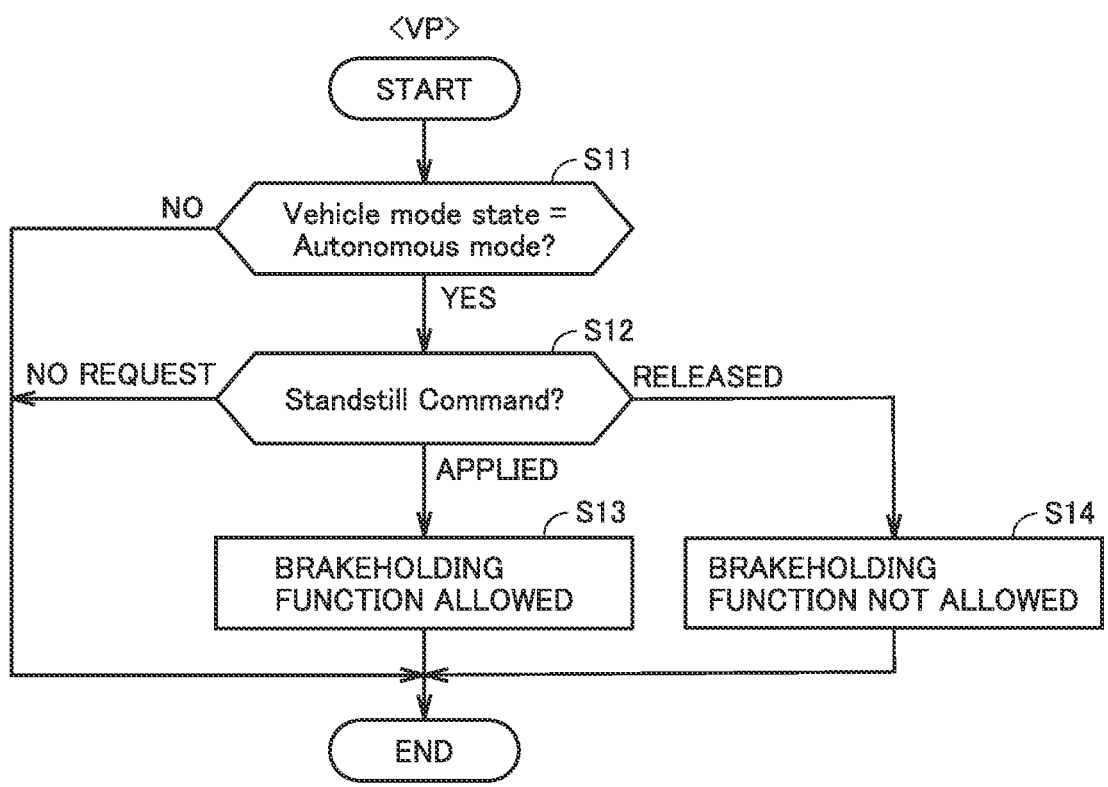
FIG. 7 is a flowchart showing a processing procedure relating to a condition for using a brakeholding function.

FIG. 7 is a flowchart showing a processing procedure relating to a condition of use of the brakeholding function. This flowchart is performed by being invoked from a main routine (not shown) when a predetermined condition is satisfied or every prescribed computing cycle. Though each step included in flowcharts shown in FIG. 7 and FIGS. 8 and 9 which will be described later is performed by software processing by ADS 11 or VP 20 (integrated control manager 31 or VCIB 40), it may be performed by hardware (electric circuitry) arranged in ADS 11 or VP 20. The step is abbreviated as S below.

In S11, VP 20 determines whether or not vehicle 1 has been set to the autonomous mode. A vehicle mode status is selected, for example, by an operation by the user onto HMI 112. When vehicle 1 has been set to the manual mode (NO in S11), subsequent processing is not performed. When vehicle 1 has been set to the autonomous mode (YES in S11), VP 20 has the process proceed to S12.

In S12, VP 20 determines contents in the standstill command received from ADS 11. When the standstill command indicates "applied", VP 20 allows the brakeholding function (S13). When the standstill command indicates "released", VP 20 does not allow the brakeholding function (S14).

Figure 8:
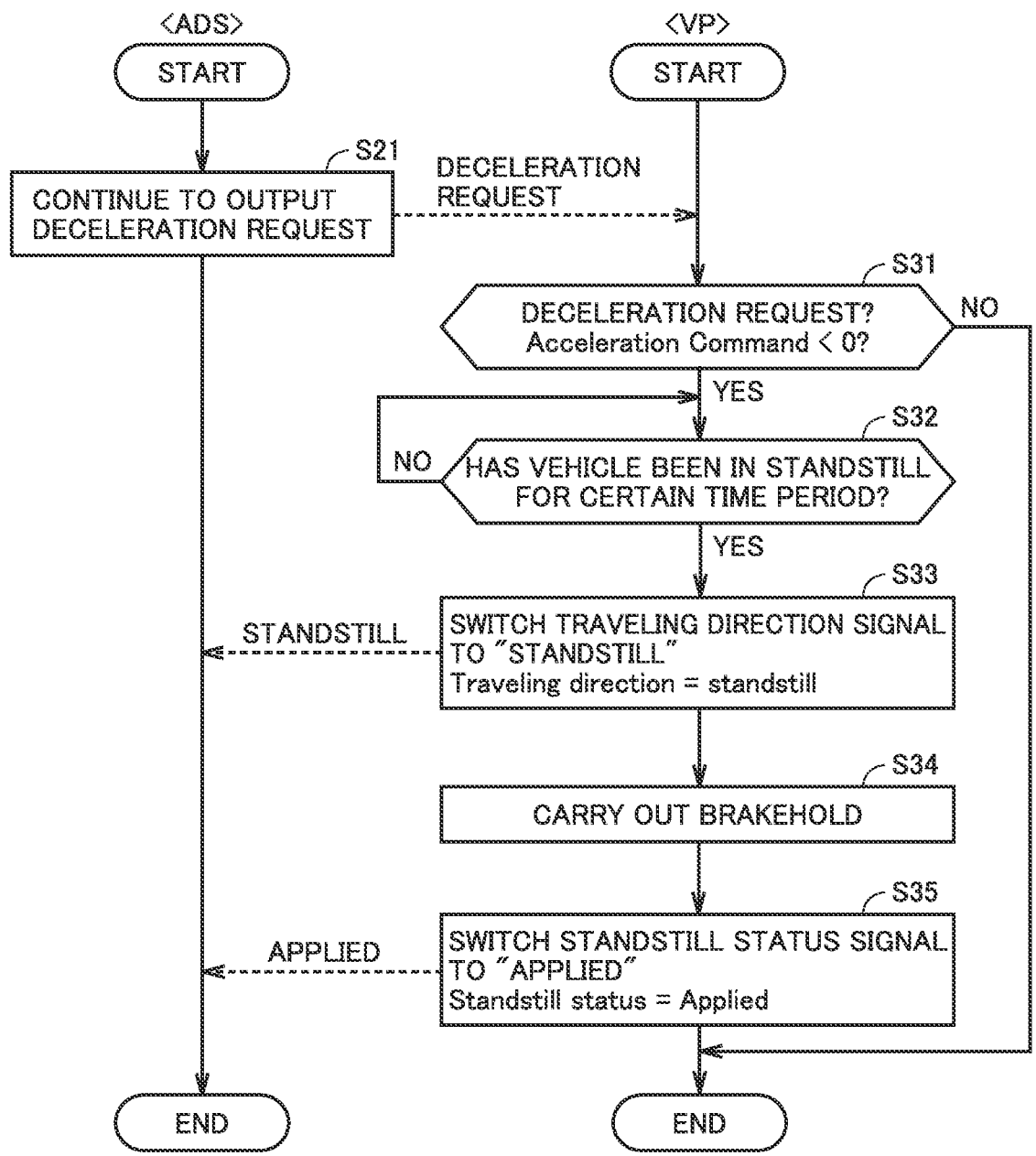
FIG. 8 is a flowchart showing a processing procedure in control relating to activation of brakehold.

FIG. 8 is a flowchart showing a processing procedure in control relating to activation of brakehold. This flowchart is performed when the standstill command indicates "applied" and the brakeholding function is allowed. In the figure, processing performed by ADS 11 is shown on the left and a series of processing performed by VP 20 is shown on the right. This is also applicable to FIG. 9 which will be described later.

In S21, ADS 11 continues to output the deceleration request to VP 20. While VP 20 receives the deceleration request from ADS 11 (YES in S31), it performs subsequent processing.

In S32, VP 20 determines whether or not vehicle 1 has been in the standstill for a certain period of time (the vehicle velocity=0 for the certain period of time). VP 20 stands by until the certain period of time elapses since the vehicle velocity attained to 0 (NO in S32), and after lapse of the certain period of time (YES in S32), VP 20 has the process proceed to S33.

In S33, VP 20 switches the traveling direction signal to "standstill" and outputs the traveling direction signal indicating "standstill" to ADS 11. Furthermore, VP 20 activates brakehold of EPB system 341 (S34). Processing in S33 and processing in S34 can be performed in an interchanged order.

In S35, VP 20 switches the standstill status signal to "applied" and outputs the standstill status signal indicating "applied" to ADS 11.

Figure 9:
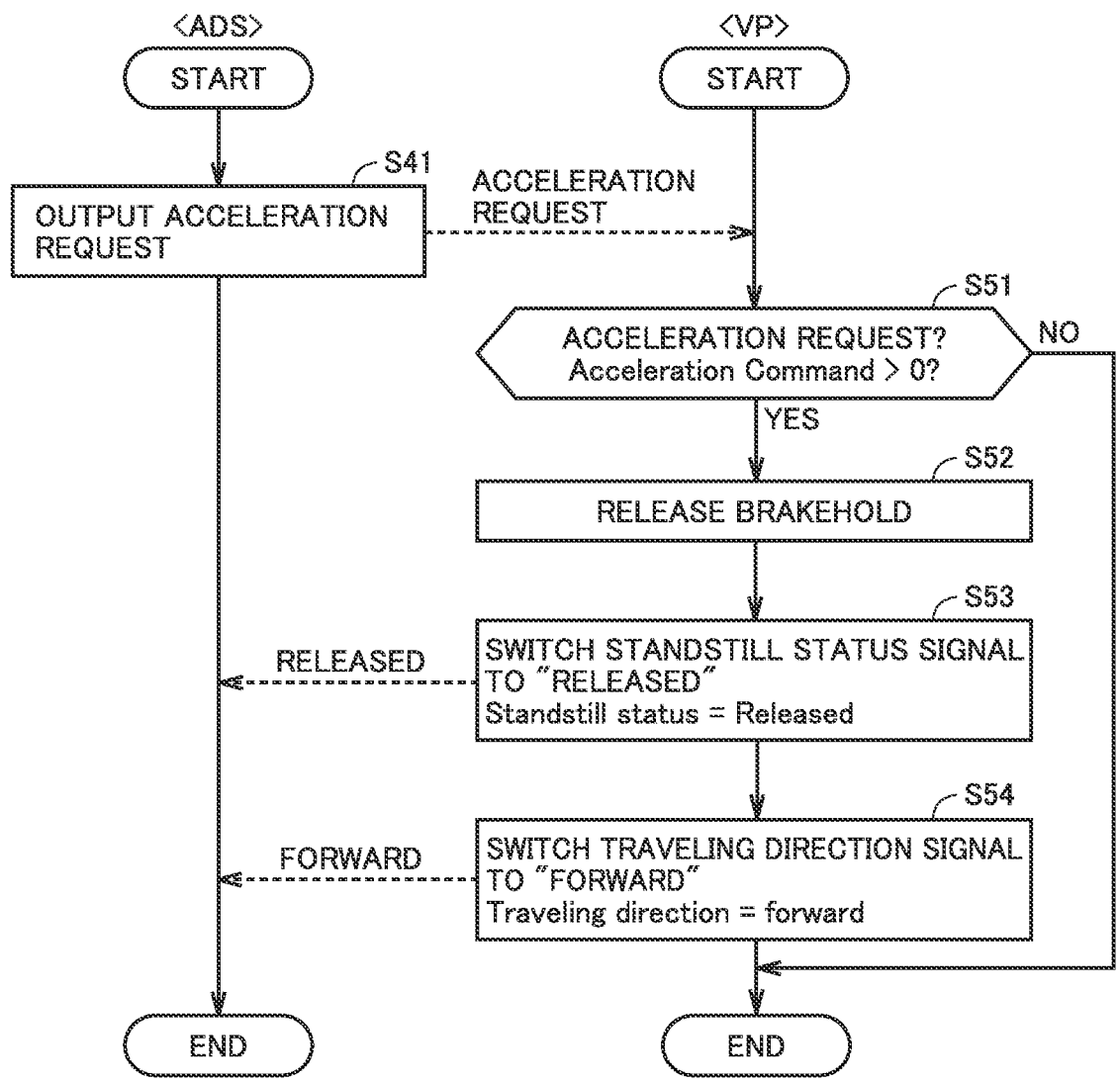
FIG. 9 is a flowchart showing a processing procedure in control relating to release of brakehold.

FIG. 9 is a flowchart showing a processing procedure in control relating to release of brakehold. In S41, ADS 11 provides the acceleration request to VP 20. When VP 20 receives the acceleration request from ADS 11 while brakehold is active (YES in S51), it performs subsequent processing.

In S52, VP 20 releases brakehold of EPB system 341. Furthermore, VP 20 switches the standstill status signal to "released" and provides the standstill status signal indicating "released" to ADS 11 (S53). Processing in S52 and processing in S53 can be performed in an interchanged order.

In S54, VP 20 switches the traveling direction signal to "forward" and provides the traveling direction signal indicating "forward" to ADS 11.

As set forth above, in the present embodiment, the acceleration command is maintained at a negative value after time t2 when the vehicle velocity attained to 0 until brakehold is activated and the standstill status signal switches to "applied", and the request for deceleration of vehicle 1 is continued. It is thus guaranteed that vehicle 1 reliably maintains the standstill state. Therefore, according to the present embodiment, vehicle 1 can safely be brought to the standstill in the autonomous mode.

Since the acceleration command is maintained at the negative value also while brakehold is active (after time t4), it can be guaranteed that vehicle 1 is more reliably maintained in the standstill.

Example

API Specification for TOYOTA Vehicle Platform Ver. 1.1

Records of Revision

| Date of Revision | ver. | Overview of Revision | Reviser |
|---|---|---|---|
| 2020 May 23 | 1.0 | Creating a new material | TOYOTA MOTOR Corp. |
| 2021 Apr. 14 | 1.1 | The figure of Front Wheel Steer Angle Rate Limitation is updated. Explanation of Standstill Status is added. | TOYOTA MOTOR Corp. |

Table of Contents

1. Introduction
   1.1. Purpose of this Specification
   1.2. Target Vehicle
   1.3. Definition of Term
2. Structure
   2.1. Overall Structure of Autono-MaaS Vehicle
   2.2. System Structure of Autono-MaaS Vehicle
3. Application Interfaces
   3.1. Typical Usage of APIs
   3.2. APIs for Vehicle Motion Control
      3.2.1. API List for Vehicle Motion Control
      3.2.2. Details of Each API for Vehicle Motion Control
   3.3. APIs for BODY Control
      3.3.1. API List for BODY Control
      3.3.2. Details of Each API for BODY Control -continued Table of Contents 3.4. APIs for Power Control
      3.4.1. API List for Power Control
      3.4.2. Details of Each API for Power Control
   3.5. APIs for Failure Notification
      3.5.1. API List for Failure Notification
      3.5.2. Details of Each API for Failure Notification
   3.6. APIs for Security
      3.6.1. API List for Security
      3.6.2. Details of Each API for Security
4. API Guides to Control Toyota Vehicles
   4.1. APIs for Vehicle Motion Control
      4.1.1. API List for Vehicle Motion Control
      4.1.2. API Guides in Details for Vehicle Motion Control
   4.2. APIs for BODY Control
      4.2.1. API List for Power Control
   4.3. APIs for Power Control
      4.3.1. API List for Power Control
   4.4. APIs for Failure Notification
      4.4.1. API List for Failure Notification
   4.5. APIs for Security
      4.5.1. API List for Security
      4.5.2. API Guides in Details for Security

1. INTRODUCTION 1.1. Purpose of this Specification

This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

Definition of Term

| Term | Definition |
|---|---|
| ADS | Autonomous Driving System |
| ADK | Autonomous Driving Kit |
| VP | Vehicle Platform |
| VCIB | Vehicle Control Interface Box. This is an ECU for the interface and the signal converter between ADS and VP's sub systems. |
| PCS | Pre-Collision Safety |

2. STRUCTURE 2.1. Overall Structure of Autono-MaaS Vehicle

Figure 10:
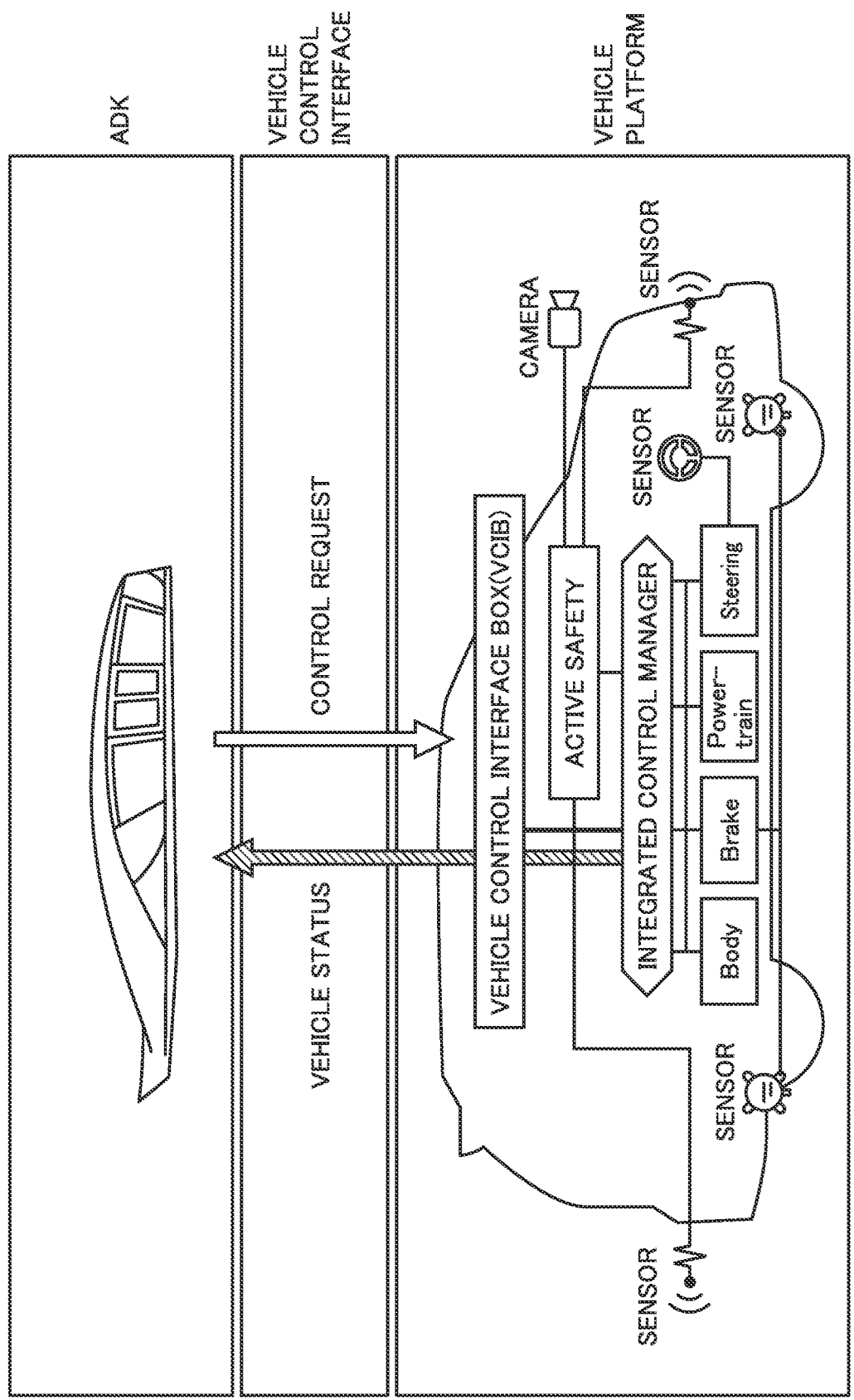
FIG. 10 is a diagram showing an overall structure of an Autono-MaaS vehicle.

The overall structure of Autono-MaaS is shown (FIG. 10).

2.2. System Structure of Autono-MaaS Vehicle

Figure 11:
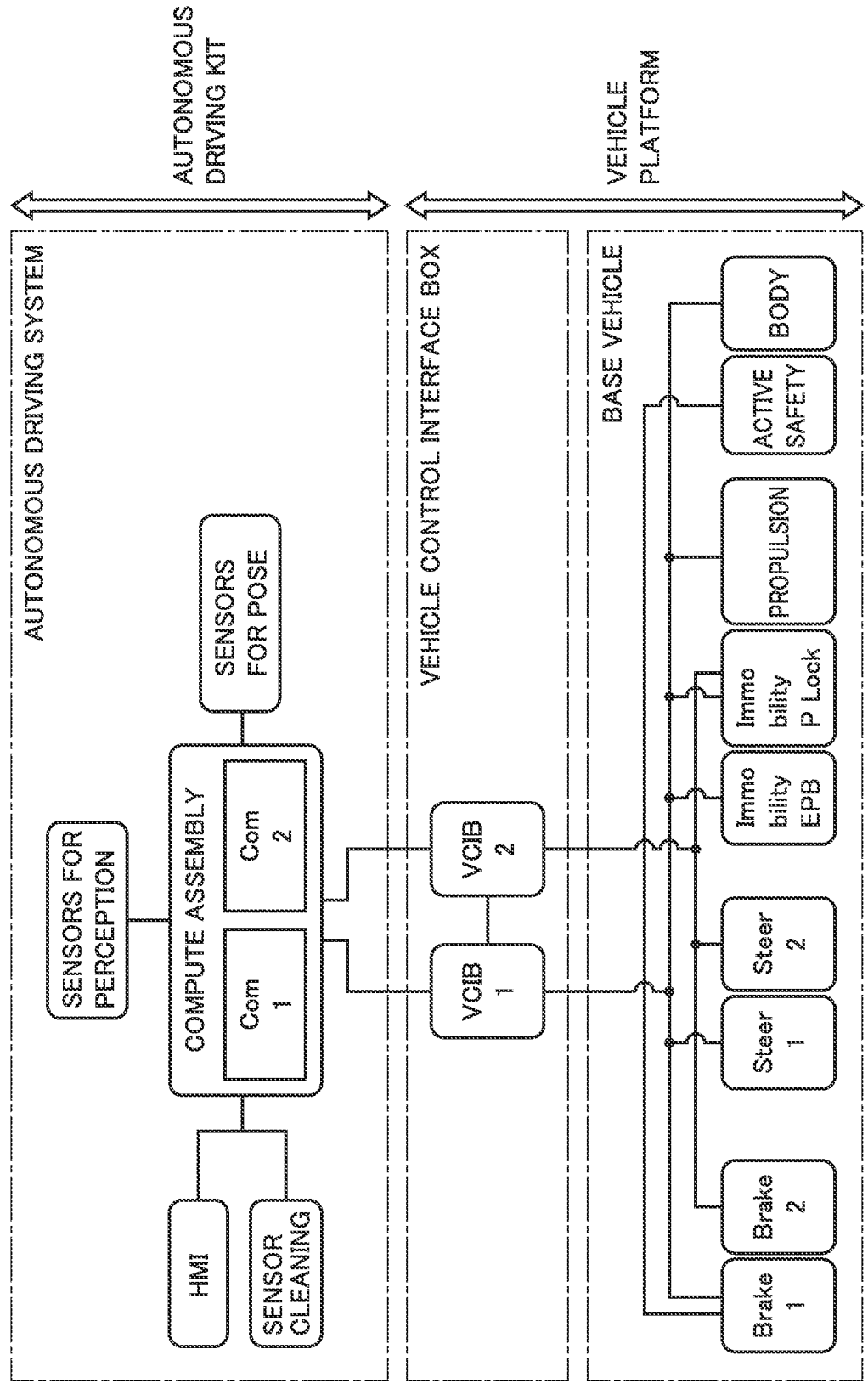
FIG. 11 is a diagram showing a system architecture of the Autono-MaaS vehicle.

System Architecture is shown in FIG. 11.

3. APPLICATION INTERFACES

3.1. Typical Usage of APIs

In this section, Typical Usage of APIs is described.

A typical workflow of APIs is as follows (FIG. 12). The following example assumes CAN for physical communication.

3.2. APIs for Vehicle Motion Control

In this section, the APIs for vehicle motion control are described.

3.2.1. API List for Vehicle Motion Control 3.2.1.1. Inputs

TABLE 3

| Input APIs for vehicle motion control | | |
|---|---|---|
| Signal Name | Description | Redundancy |
| Propulsion Direction Command | Request for shift change from/to forward (D range) to/from back (R range) | N/A |

TABLE 3-continued

| Input APIs for vehicle motion control | | |
|---|---|---|
| Signal Name | Description | Redundancy |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK 3.2.1.2. Outputs

TABLE 4

| Output APIs for vehicle motion control | | |
|---|---|---|
| Signal Name | Description | Redundancy |
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (intervention) | N/A |
| Intervention of steering wheel | This signal shows whether the steering wheel is turned by a driver (intervention) | N/A |
| Intervention of shift lever | This signal shows whether the shift lever is controlled by a driver (intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control

3.2.2.1. Propulsion Direction Command

Request for shift change from/to forward (D range) to/from back (R range)

| Values | | |
|---|---|---|
| Value | Description | Remarks |
| 0 | No Request | |
| 2 | R | Shift to R range |
| 4 | D | Shift to D range |
| other | Reserved | |

Remarks
Available only when Vehicle mode state = "Autonomous Mode."
Available only when a vehicle is stationary (Traveling direction = "standstill").
Available only when brake is applied.

3.2.2.2. Immobilization Command

Request for Turning on/Off WheelLock
Values
The following table shows a case where EPB and Shift P are used for immobilization.

| Value | Description | Remarks |
|---|---|---|
| 0 | No Request | |
| 1 | Applied | EPB is turned on and shift position is changed to "P" |
| 2 | Released | EPB is turned off and shift position is changed to the value of Propulsion Direction Command |

Remarks
This API is used for parking a vehicle.
Available only when Vehicle mode state = "Autonomous Mode."
Changeable only when the vehicle is stationary (Traveling direction = "standstill").
Changeable only while brake is applied.

3.2.2.3. Standstill Command

Request for Applying/Releasing Brake Holding Function

| Values | | |
|---|---|---|
| Value | Description | Remarks |
| 0 | No Request | |
| 1 | Applied | Brake holding function is allowed. |
| 2 | Released | |

Remarks
This API is used for choosing a status of whether the brake holding function is allowed.
Available only when Vehicle mode state = "Autonomous Mode."
Acceleration Command (deceleration request) has to be continued until Standstill Status becomes "Applied".

3.2.2.4. Acceleration Command

Request for Acceleration
Values
Estimated maximum deceleration to Estimated maximum acceleration [m/s$^2$]
Remarks
Available only when Vehicle mode state="Autonomous Mode."
Acceleration (+) and deceleration (—) request based on Propulsion Direction Status direction.
The upper/lower limit will vary based on Estimated maximum deceleration and Estimated maximum acceleration.
When acceleration more than Estimated maximum acceleration is requested, the request is set to Estimated maximum acceleration.
When deceleration more than Estimated maximum deceleration is requested, the request is set to Estimated maximum deceleration.
In case where a driver operates a vehicle (over-ride), the requested acceleration may not be achieved.
When PCS simultaneously works, VP should choose minimum acceleration (maximum deceleration).

3.2.2.5. Front Wheel Steer Angle Command

| Values | | |
|---|---|---|
| Value | Description | Remarks |
| — | [unit: rad] | |

Remarks
Available only when Vehicle mode state = "Autonomous Mode"
Left is positive value (+). Right is negative value (−).
Front wheel steer angle is set to value (0) when the vehicle is going straight.
This request is set as a relative value from the current one to prevent misalignment of "Front Wheel Steer Angle" from being accumulated.
The request value should be set within Front wheel steer angle rate limitaion.
In case where a driver operates a vehicle (over-ride), the requested Front Wheel Steer Angle may not be achieved.

3.2.2.6. Vehicle Mode Command

Request for Changing from/to Manual Mode to/from Autonomous Mode

| Values | | |
|---|---|---|
| Value | Description | Remarks |
| 0 | No Request | |
| 1 | Request For Autonomy | |
| 2 | Deactivation Request | means transition request to manual mode |

Remarks
N/A

3.2.2.7. High Dynamics Command

If ADK would like to increase braking response performance* of VP, High Dynamics Command should be set to "High".
*Reaction time in VP upon a request from ADK

| Values | | |
|---|---|---|
| Value | Description | Remarks |
| 0 | No Request | |
| 1 | High | |
| 2-3 | Reserved | |

Remarks
N/A

3.2.2.8. Propulsion Direction Status

Current Shift Status

| Values | | |
|---|---|---|
| Value | Description | Remarks |
| 0 | Reserved | |
| 1 | P | |
| 2 | R | |
| 3 | N | |
| 4 | D | |

-continued

| Values | | |
|---|---|---|
| Value | Description | Remarks |
| 5 | Reserved | |
| 6 | Invalid value | |

Remarks
If VP does not know the current shift status, this output is set to "Invalid Value."

3.2.2.9. Immobilization Status
Each Immobilization System Status
Values
The following table shows a case where EPB and Shift P are used for immobilization.

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks
N/A 3.2.2.10. Standstill Status
Status of Standstill

| Values | | |
|---|---|---|
| Value | Description | Remarks |
| 0 | Released | |
| 1 | Applied | |
| 2 | Reserved | |
| 3 | Invalid value | |

Remarks
N/A 3.2.2.11. Estimated Gliding Acceleration
Acceleration calculated in VP in case that throttle is closed, considering slope, road load and etc.
Values
[unit: m/s$^2$]
Remarks
When the Propulsion Direction Status is "D", acceleration for forward direction shows a positive value.
When the Propulsion Direction Status is "R", acceleration for reverse direction shows a positive value.

3.2.2.12. Estimated Maximum Acceleration
Acceleration calculated in VP in case that throttle is fully open, considering slope, road load and etc.
Values
[unit: m/s$^2$]
Remarks
When the Propulsion Direction Status is "D", acceleration for forward direction shows a positive value.
When the Propulsion Direction Status is "R", acceleration for reverse direction shows a positive value.

3.2.2.13. Estimated Maximum Deceleration
Maximum deceleration calculated in VP in case that brake in VP is requested as maximum, considering slope, road load and etc.
Values
[unit: m/s$^2$]
Remarks
When the Propulsion Direction Status is "D", deceleration for forward direction shows a negative value.
When the Propulsion Direction Status is "R", deceleration for reverse direction shows a negative value.

3.2.2.14. Front Wheel Steer Angle

| Values | | |
|---|---|---|
| Value | Description | Remarks |
| Minimum Value | Invalid value | |
| others | [unit: rad] | |

Remarks
Left is positive value (+). Right is negative value (−).
This signal should show invalid value until VP can calculate correct value or when the sensor is invalid/failed.

3.2.2.15. Front Wheel Steer Angle Rate
Front wheel steer angle rate

| Values | | |
|---|---|---|
| Value | Description | Remarks |
| Minimum Value | Invalid value | |
| others | [unit: rad/s] | |

Remarks
Left is positive value (+). Right is negative value (−).
This signal should show invalid value until VP can calculate correct value or when the Front wheel angle shows the minimum value.

Figure 13:
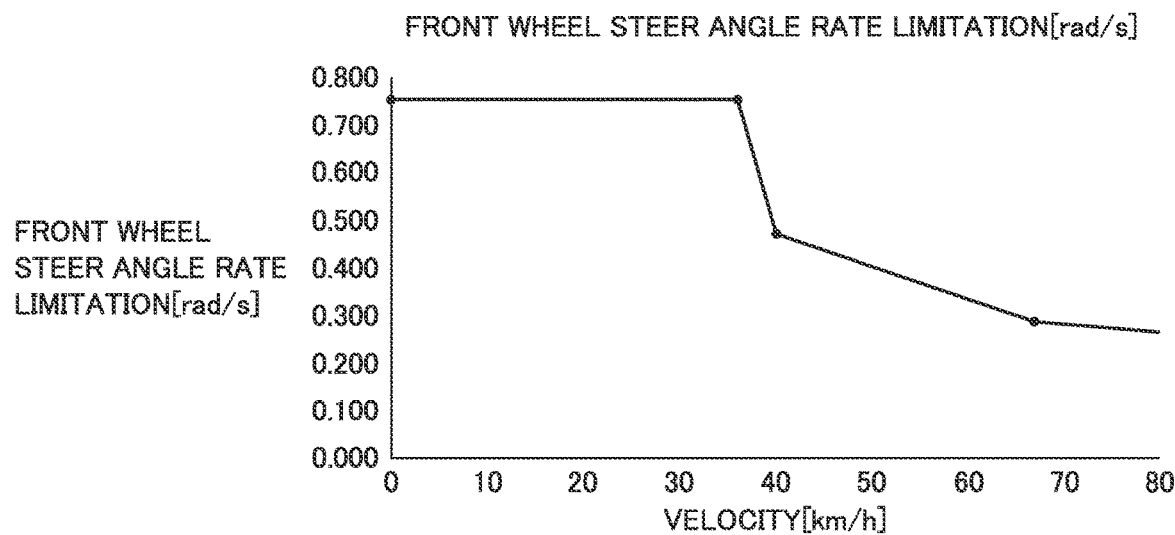
FIG. 13 is a diagram showing relation between a front wheel steer angle rate limitation and a velocity.
Figure 14:
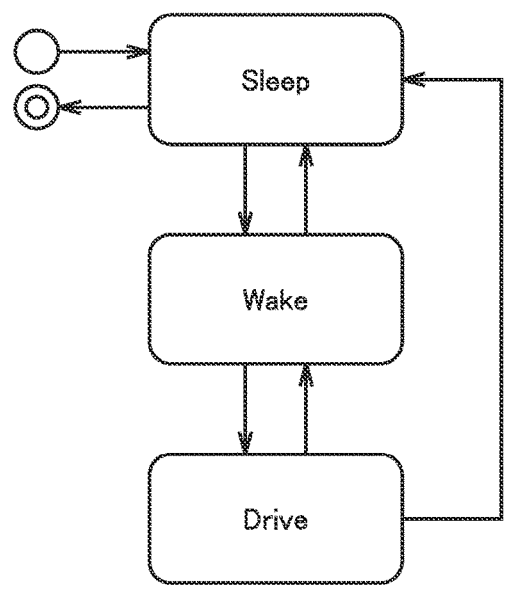
FIG. 14 is a state machine diagram of the power mode.

3.2.2.16. Front wheel steer angle rate limitation
The limit of the Front wheel steer angle rate
Values
[unit: rad/s]
Remarks
The limitation is calculated from the "vehicle speed—steering angle rate" map as shown in following Table 5 and FIG. 13.
A) At a low speed or stopped situation, use fixed value (0.751 [rad/s]).
B) At a higher speed, the steering angle rate is calculated from the vehicle speed using 3.432 m/s$^3$.

TABLE 5

| "vehicle speed - steering angle rate" map | | | | | |
|---|---|---|---|---|---|
| Velocity [km/h] | 0.0 | 36.0 | 40.0 | 67.0 | 84.0 |
| Front Wheel Steer Angle Rate Limitation [rad/s] | 0.751 | 0.751 | 0.469 | 0.287 | 0.253 |

3.2.2.17. Estimated Maximum Lateral Acceleration
Values
[unit: m/s$^2$] (fixed value: 3.432)
Remarks
Maximum lateral acceleration defined for VP.

3.2.2.18. Estimated Maximum Lateral Acceleration Rate
Values
[unit: m/s$^3$] (fixed value: 3.432)
Remarks
Maximum lateral acceleration rate defined for VP.

3.2.2.19. Intervention of accelerator pedal
This signal shows whether the accelerator pedal is depressed by a driver (intervention).

| Values | | |
|---|---|---|
| Value | Description | Remarks |
| 0 | Not depressed | |
| 1 | depressed | |
| 2 | Beyond autonomy acceleration | |

Remarks

When a position of accelerator pedal is higher than a defined threshold, this signal is set to "depressed".

When the requested acceleration calculated from a position of accelerator pedal is higher than the requested acceleration from ADS, this signal is set as "Beyond autonomy acceleration."

3.2.2.20. Intervention of Brake Pedal

This signal shows whether the brake pedal is depressed by a driver (intervention).

| Values | | |
|---|---|---|
| Value | Description | Remarks |
| 0 | Not depressed | |
| 1 | depressed | |
| 2 | Beyond autonomy deceleration | |

Remarks

When a position of brake pedal is higher than a defined threshold value, this signal is set to "depressed".

When the requested deceleration calculated from a position of brake pedal is higher than the requested deceleration from ADS, this signal is set as "Beyond autonomy deceleration".

3.2.2.21. Intervention of Steering Wheel

This signal shows whether the steering wheel is operated by a driver (intervention).

| Values | | |
|---|---|---|
| Value | Description | Remarks |
| 0 | Not turned | |
| 1 | ADS and driver collaboratively work | |
| 2 | Only by human driver | |

Remarks

In "Intervention of steering wheel = 1", considering the human driver's intent, EPS system drivers the steering with the Human driver collaboratively.

In "Intervention of steering wheel = 2", considering the human driver's intent, the steering request from ADS is not achieved. (The steering will be driven by human driver.)

3.2.2.22. Intervention of Shift Lever

This signal shows whether the shift lever is controlled by a driver (intervention)

| Values | | |
|---|---|---|
| Value | Description | Remarks |
| 0 | OFF | |
| 1 | ON | Controlled (moved to any shift position) |

Remarks
N/A

3.2.2.23. Wheel Speed Pulse (Front Left), Wheel Speed Pulse (Front Right), Wheel Speed Pulse (Rear Left), Wheel Speed Pulse (Rear Right)

| Values | | |
|---|---|---|
| Value | Description | Remarks |
| Maximum Value in transmission bits | Invalid value | The sensor is invalid. |
| others | ticks [unit: —] | The number of pulses per one round wheel depends on VP. |

Remarks

A pulse value is integrated at the pulse falling timing.

This wheel speed sensor outputs 96 pulses with a single rotation.

Regardless of invalid/failure of wheel speed sensor, wheel speed pulse will be updated.

When "1" is subtracted from a pulse value which shows "0", the value changes to "0xFF".

When "1" is added to a pulse value which shows "0xFF", the value changes to "0".

Until the rotation direction is determined just after ECU is activated, a pulse value will be added as the rotation direction is "Forward".

When detected forward rotation, a pulse value will be added.

When detected reverse rotation, a pulse value will be subtracted.

3.2.2.24. Wheel Rotation Direction (Front Left), Wheel Rotation Direction (Front Right), Wheel Rotation Direction (Rear Left), Wheel Rotation Direction (Rear Right)

| Values | | |
|---|---|---|
| Value | Description | Remarks |
| 0 | Forward | |
| 1 | Reverse | |
| 2 | Reserved | |
| 3 | Invalid value | The sensor is invalid. |

Remarks

"Forward" is set until the rotation direction is determined after VP is turned on.

3.2.2.25. Traveling Direction

Moving Direction of Vehicle

| Values | | |
|---|---|---|
| Value | Description | Remarks |
| 0 | Forward | |
| 1 | Reverse | |
| 2 | Standstill | |
| 3 | Undefined | |

Remarks

This signal shows "Standstill" when four wheel speed values are "0" during a constant time.

When shift is changed right after vehicle starts, it is possible to be "Undefined".

3.2.2.26. Vehicle Velocity

Estimated Longitudinal Velocity of Vehicle

| Values | | |
|---|---|---|
| Value | Description | Remarks |
| Maximum Value in transmission bits | Invalid value | The sensor is invalid. |
| others | Velocity [unit: m/s] | |

Remarks

The value of this signal is a positive value when both forward direction and reverse direction.

3.2.2.27. Longitudinal Acceleration
Estimated Longitudinal Acceleration of Vehicle

| Values | | |
|---|---|---|
| Value | Description | Remarks |
| Minimum Value in transmission bits | Invalid value | The sensor is invalid. |
| others | Acceleration [unit: m/s$^2$] | |

Remarks
Acceleration (+) and deceleration (−) value based on Propulsion Direction Status direction.

3.2.2.28. Lateral Acceleration
Lateral Acceleration of Vehicle

| Values | | |
|---|---|---|
| Value | Description | Remarks |
| Minimum Value in transmission bits | Invalid value | The sensor is invalid. |
| others | Acceleration [unit: m/s$^2$] | |

Remarks
A positive value shows counterclockwise. A negative value shows clockwise.

3.2.2.29. Yaw Rate
Sensor Value of Yaw Rate

| Values | | |
|---|---|---|
| Value | Description | Remarks |
| Minimum Value in transmission bits | Invalid value | The sensor is invalid. |
| others | Yaw rate [unit: deg/s] | |

Remarks
A positive value shows counterclockwise. A negative value shows clockwise.

3.2.2.30. Slipping Detection
Detection of Tire Glide/Spin/Skid

| Values | | |
|---|---|---|
| Value | Description | Remarks |
| 0 | Not Slipping | |
| 1 | Slipping | |
| 2 | Reserved | |
| 3 | Invalid value | |

Remarks
This signal is determined as "Slipping" when any of the following systems has been activated.
ABS (Anti-lock Braking System)
TRC (TRaction Control)
VSC (Vehicle Stability Control)
VDIM (Vehicle Dynamics Integrated Management)

3.2.2.31. Vehicle Mode State
Autonomous or Manual Mode

| Values | | |
|---|---|---|
| Value | Description | Remarks |
| 0 | Manual Mode | The mode starts from Manual mode. |
| 1 | Autonomous Mode | |

Remarks
The initial state is set to "Manual Mode."

3.2.2.32. Readiness for Autonomization

This signal shows whether a vehicle can change to Autonomous Mode or not

| Values | | |
|---|---|---|
| Value | Description | Remarks |
| 0 | Not Ready For Autonomous Mode | |
| 1 | Ready For Autonomous Mode | |
| 3 | Invalid | The status is not determined yet. |

Remarks
N/A

3.2.2.33. Failure Status of VP Functions for Autonomous Mode

This signal is used to show whether VP functions have some failures mode when a vehicle works as Autonomous Mode.

| Values | | |
|---|---|---|
| Value | Description | Remarks |
| 0 | No fault | |
| 1 | Fault | |
| 3 | Invalid | The status is not determined yet. |

Remarks
N/A

3.2.2.34. PCS Alert Status

| Values | | |
|---|---|---|
| Value | Description | Remarks |
| 0 | Normal | |
| 1 | Alert | Request alert from PCS system |
| 3 | Unavailable | |

Remarks
N/A

3.2.2.35. PCS Preparation Status
Prefill Status as the Preparation of PCS Brake

| Values | | |
|---|---|---|
| Value | Description | Remarks |
| 0 | Normal | |
| 1 | Active | |
| 3 | Unavailable | |

Remarks
"Active" is a status in which PCS prepares brake actuator to shorten the latency from a deceleration request issued by PCS.
When a value turns to "Active" during Vehicle mode state = "Autonomous Mode," "ADS/PCS arbitration status" shows "ADS".

3.2.2.36. PCS Brake/PCS Brake Hold Status

| Value | Description | Remarks |
|---|---|---|
| 0 | Normal | |
| 1 | PCS Brake | |
| 2 | PCS Brake Hold | |
| 7 | Unavailable | |

Remarks
N/A

3.2.2.37. ADS/PCS arbitration status
Arbitration Status

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks
When acceleration requested by PCS system in VP is smaller than one requested by ADS, the status is set as "PCS".
When acceleration requested by PCS system in VP is larger than one requested by ADS, the status is set as "ADS".

3.3. APIs for BODY Control

3.3.1. API List for BODY Control
3.3.1.1. Inputs

TABLE 6

| Input APIs for BODY Control | | |
|---|---|---|
| Signal Name | Description | Redundancy |
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

Output APIs for BODY Control

| Signal Name | Description | Redundancy |
| --- | --- | --- |
| Turnsignal status | Status of the current turnsignallight mode of the vehicle platform | N/A |
| Headlight status | Status of the current headlight mode of the vehicle platform | N/A |
| Hazard light status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control 3.3.2.1. Turn Signal Command

Request to Control Turn-Signal

| Values | | |
| --- | --- | --- |
| Value | Description | Remarks |
| 0 | OFF | |
| 1 | Right | Right blinker ON |
| 2 | Left | Left blinker ON |
| 3 | Reserved | |

Remarks

N/A 3.3.2.2. Headlight Command

Request to Control Headlight

| Values | | |
| --- | --- | --- |
| Value | Description | Remarks |
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks

This command is valid when headlight mode on the combination switch = "OFF" or "Auto mode = ON."

Driver operatio overrides this command.

3.3.2.3. Hazard Light Command

Request to Control Hazard Light

| Values | | |
|---|---|---|
| Value | Description | Remarks |
| 0 | No Request | |
| 1 | ON | |

Remarks

Driver operation overrides this command.
Hazardlight is ON while receiving "ON" command.

3.3.2.4. Horn Pattern Command

Request to Choose a Pattern of ON-Time and OFF-Time Per Cycle

| Values | | |
|---|---|---|
| Value | Description | Remarks |
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks

N/A

3.3.2.5. Horn Cycle Command

Request to Choose the Number of ON and OFF Cycles

Values 0 to 7 [–]

Remarks

N/A

3.3.2.6. Continuous Horn Command

Request to Turn on/Off Horn

| Values | | |
|---|---|---|
| Value | Description | Remarks |
| 0 | No request | |
| 1 | ON | |

Remarks

This command's priority is higher than 3.3.2.4 Horn pattern and 3.3.2.5 Horn cycle command.
Horn is "ON" while receiving "ON" command.

3.3.2.7. Front Windshield Wiper Command

Request to Control Front Windshield Wiper

| Values | | |
|---|---|---|
| Value | Description | Remarks |
| 0 | OFF mode request | |
| 1 | Lo mode request | |
| 2 | Hi mode request | |
| 3 | Intermittent mode request | |
| 4 | Auto mode request | |

| Values | | |
|---|---|---|
| Value | Description | Remarks |
| 5 | Mist mode request | One-time wiping |
| 6, 7 | Reserved | |

Remarks

This command is valid when front windshield wiper mode on a combination switch is "OFF" or "AUTO".
Driver input overrides this command.
Windshieldwiper mode is kept while receiving a command.
Wiping speed of intermittent mode is fixed.

3.3.2.8. Rear Windshield Wiper Command

Request to Control Rear Windshield Wiper

| Values | | |
|---|---|---|
| Value | Description | Remarks |
| 0 | OFF mode request | |
| 1 | Lo mode request | |
| 2 | Reserved | |
| 3 | Intermittent mode request | |
| 4-7 | Reserved | |

Remarks

Driver input overrides this command.
Windshieldwiper mode is kept while receiving a command.
Wiping speed of intermittent mode is fixed.

3.3.2.9. HVAC (1st Row) Operation Command

Request to Start/Stop 1st Row Air Conditioning Control

| Values | | |
|---|---|---|
| Value | Description | Remarks |
| 0 | No request | |
| 1 | ON | |
| 2 | OFF | |

Remarks

N/A

3.3.2.10. HVAC (2nd Row) Operation Command

Request to Start/Stop 2nd Row Air Conditioning Control

| Values | | |
|---|---|---|
| Value | Description | Remarks |
| 0 | No request | |
| 1 | ON | |
| 2 | OFF | |

Remarks

N/A

3.3.2.11. Target Temperature (1st Left) Command

Request to Set Target Temperature in Front Left Area

| Values | | |
|---|---|---|
| Value | Description | Remarks |
| 0 | | No request |
| 60 to 85 [unit: °F.] (by 1.0° F.) | | Target temperature |

Remarks

In case °C. is used in VP, value should be set as °C.

3.3.2.12. Target Temperature (1st Right) Command
Request to Set Target Temperature in Front Right Area

| Values | | |
|---|---|---|
| Value | Description | Remarks |
| 0 | No request | |
| 60 to 85 [unit: °F.] (by 1.0° F.) | Target temperature | |

Remarks
In case °C. is used in VP, value should be set as °C.

3.3.2.13. Target Temperature (2nd Left) Command
Request to Set Target Temperature in Rear Left Area

| Values | | |
|---|---|---|
| Value | Description | Remarks |
| 0 | No request | |
| 60 to 85 [unit: °F.] (by 1.0° F.) | Target temperature | |

Remarks
In case °C. is used in VP, value should be set as °C.

3.3.2.14. Target Temperature (2nd Right) Command
Request to Set Target Temperature in Rear Right Area

| Values | | |
|---|---|---|
| Value | Description | Remarks |
| 0 | No request | |
| 60 to 85 [unit: °F.] (by 1.0° F.) | Target temperature | |

Remarks
In case °C. is used in VP, value should be set as °C.

3.3.2.15. HVAC Fan (1st Row) Command
Request to Set Fan Level of Front AC

| Values | | |
|---|---|---|
| Value | Description | Remarks |
| 0 | No request | |
| 1 to 7 (Maximum) | Fan level | |

Remarks
If you would like to turn the fan level to 0 (OFF), you should transmit "HVAC (1st row) operation command = OFF."
If you would like to turn the fan level to AUTO, you should transmit "HVAC (1st row) operation command = ON."

3.3.2.16. HVAC Fan (2nd Row) Command
Request to Set Fan Level of Rear AC

| Values | | |
|---|---|---|
| Value | Description | Remarks |
| 0 | No request | |
| 1 to 7 (Maximum) | Fan level | |

Remarks
If you would like to turn the fan level to 0 (OFF), you should transmit "HVAC (2nd row) operation command = OFF."
If you would like to turn the fan level to AUTO, you should transmit "HVAC (2nd row) operation command = ON."

3.3.2.17. Air Outlet (1st Row) Command
Request to Set 1st Row Air Outlet Mode

| Values | | |
|---|---|---|
| Value | Description | Remarks |
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks
N/A

3.3.2.18. Air Outlet (2nd Row) Command
Request to Set 2nd Row Air Outlet Mode

| Values | | |
|---|---|---|
| Value | Description | Remarks |
| 0 | No Operation | |
| 1 | UPPER | Air flows to upper body |
| 2 | U/F | Air flows to the upper body and feet |
| 3 | FEET | Air flows to feet. |

Remarks
N/A

3.3.2.19. Air Recirculation Command
Request to Set Air Recirculation Mode

| Values | | |
|---|---|---|
| Value | Description | Remarks |
| 0 | No request | |
| 1 | ON | |
| 2 | OFF | |

Remarks
N/A

3.3.2.20. AC Mode Command
Request to Set AC Mode

| Values | | |
|---|---|---|
| Value | Description | Remarks |
| 0 | No request | |
| 1 | ON | |
| 2 | OFF | |

Remarks
N/A

3.3.2.21. Turn Signal Status

| Values | | |
|---|---|---|
| Value | Description | Remarks |
| 0 | OFF | |
| 1 | Left | |
| 2 | Right | |
| 3 | Invalid | |

Remarks
N/A

3.3.2.22. Headlight Status

| Values | | |
|---|---|---|
| Value | Description | Remarks |
| 0 | OFF | |
| 1 | TAIL | |
| 2 | Lo | |
| 3 | Reserved | |
| 4 | Hi | |
| 5-6 | Reserved | |
| 7 | Invalid | |

Remarks
N/A

3.3.2.23. Hazard Light Status

| Values | | |
|---|---|---|
| Value | Description | Remarks |
| 0 | OFF | |
| 1 | Hazard | |
| 2 | Reserved | |
| 3 | Invalid | |

Remarks
N/A

3.3.2.24. Horn Status

| Values | | |
|---|---|---|
| Value | Description | Remarks |
| 0 | OFF | |
| 1 | ON | |
| 2 | Reserved | |
| 3 | Invalid | |

Remarks
In the case that 3.3.2.4 the Horn Pattern Command is active, the Horn status is "1" even if there are OFF periods in some patterns.

3.3.2.25. Front Windshield Wiper Status

| Values | | |
|---|---|---|
| Value | Description | Remarks |
| 0 | OFF | |
| 1 | Lo | |
| 2 | Hi | |
| 3 | INT | |
| 4-5 | Reserved | |
| 6 | Fail | |
| 7 | Invalid | |

Remarks
N/A

3.3.2.26. Rear Windshield Wiper Status

| Values | | |
|---|---|---|
| Value | Description | Remarks |
| 0 | OFF | |
| 1 | Lo | |
| 2 | Reserved | |
| 3 | INT | |
| 4-5 | Reserved | |
| 6 | Fail | |
| 7 | Invalid | |

Remarks
N/A

3.3.2.27. HVAC (1st Row) Status

| Values | | |
|---|---|---|
| Value | Description | Remarks |
| 0 | OFF | |
| 1 | ON | |

Remarks
N/A

3.3.2.28. HVAC (2nd Row) Status

| Values | | |
|---|---|---|
| Value | Description | Remarks |
| 0 | OFF | |
| 1 | ON | |

Remarks
N/A

3.3.2.29. Target Temperature (1st Left) Status

| Values | | |
|---|---|---|
| Value | Description | Remarks |
| 0 | Lo | Max cold |
| 60 to 85 [unit: °F.] | Target temperature | |
| 100 | Hi | Max hot |
| FFh | Unknown | |

Remarks
In case °C. is used in VP, value should be set as °C.

3.3.2.30. Target Temperature (1st Right) Status

| Values | | |
|---|---|---|
| Value | Description | Remarks |
| 0 | Lo | Max cold |
| 60 to 85 [unit: °F.] | Target temperature | |
| 100 | Hi | Max hot |
| FFh | Unknown | |

Remarks
In case °C. is used in VP, value should be set as °C.

3.3.2.31. Target Temperature (2nd Left) Status

| Values | | |
|---|---|---|
| Value | Description | Remarks |
| 0 | Lo | Max cold |
| 60 to 85 [unit: °F.] | Target temperature | |

-continued

| Values | | |
|---|---|---|
| Value | Description | Remarks |
| 100 | Hi | Max hot |
| FFh | Unknown | |

Remarks

In case ° C. is used in VP, values should be set as ° C.

3.3.2.32. Target Temperature (2nd Right) Status

| Values | | |
|---|---|---|
| Value | Description | Remarks |
| 0 | Lo | Max cold |
| 60 to 85 [unit: ° F.] | Target temperature | |
| 100 | Hi | Max hot |
| FFh | Unknown | |

Remarks

In case ° C. is used in VP, values should be set as ° C.

3.3.2.33. HVAC Fan (1st Row) Status

| Values | | |
|---|---|---|
| Value | Description | Remarks |
| 0 | OFF | |
| 1 to 7 | Fan Level | |
| 8 | Undefined | |

Remarks
N/A

3.3.2.34. HVAC Fan (2nd Row) Status

| Values | | |
|---|---|---|
| Value | Description | Remarks |
| 0 | OFF | |
| 1 to 7 | Fan Level | |
| 8 | Undefined | |

Remarks
N/A

3.3.2.35. Air Outlet (1st Row) Status

| Values | | |
|---|---|---|
| Value | Description | Remarks |
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks
N/A

3.3.2.36. Air Outlet (2nd Row) Status

| Values | | |
|---|---|---|
| Value | Description | Remarks |
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks
N/A

3.3.2.37. Air Recirculation Status

| Values | | |
|---|---|---|
| Value | Description | Remarks |
| 0 | OFF | |
| 1 | ON | |

Remarks
N/A

3.3.2.38. AC Mode Status

| Values | | |
|---|---|---|
| Value | Description | Remarks |
| 0 | OFF | |
| 1 | ON | |

Remarks
N/A

3.3.2.39. Seat Occupancy (1st Right) Status

| Values | | |
|---|---|---|
| Value | Description | Remarks |
| 0 | Not occupied | |
| 1 | Occupied | |
| 2 | Undecided | In case of IG OFF or communication disruption to seat sensor |
| 3 | Failed | |

Remarks
When there is luggage on the seat, this signal may be set as "Occupied".

3.3.2.40. Seat Belt (1st Left) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Fault of a switch | |

Remarks
N/A

3.3.2.41. Seat Belt (1st Right) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Fault of a switch | |

Remarks
N/A

3.3.2.42. Seat Belt (2nd Left) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
cannot detect sensor failure

3.3.2.43. Seat Belt (2nd Right) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
cannot detect sensor failure

3.3.2.44. Seat Belt (3rd Left) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
cannot detect sensor failure

3.3.2.45. Seat Belt (3rd Center) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
cannot detect sensor failure

3.3.2.46. Seat Belt (3rd Right) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
cannot detect sensor failure

3.4. APIs for Power Control

3.4.1. API List for Power Control
3.4.1.1. Inputs

TABLE 8

| Input APIs for Power control | | |
|---|---|---|
| Signal Name | Description | Redundancy |
| Power mode command | Command to control the power mode of VP | N/A |

3.4.1.2. Outputs

TABLE 9

| Output APIs for Power control | | |
|---|---|---|
| Signal Name | Description | Redundancy |
| Power mode status | Status of the current power mode of VP | N/A |

3.4.2. Details of Each API for Power Control
3.4.2.1. Power Mode Command
Request to Control Power Mode

| Values | | |
|---|---|---|
| Value | Description | Remarks |
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Remarks
The state machine diagram of the power modes is shown in FIG. 8.

[Sleep]
Vehicle power off condition. In this mode, the main battery does not supply power to each system, and neither VCIB nor other VP ECUs are activated.

[Wake]
VCIB is awake by the auxiliary battery. In this mode, ECUs other than VCIB are not awake except for some of the body electrical ECUs.

[Driving Mode]
Vehicle power on condition. In this mode, the main battery supplies power to the whole VP and all the VP ECUs including VCIB are awake.

3.4.2.2. Power Mode Status

| | Values | |
|---|---|---|
| Value | Description | Remarks |
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

Remarks
VCIB will transmit [Sleep] as Power_Mode_Status continuously for 3000 [ms] after executing the sleep sequence. And then, VCIB will shut down.
ADS should stop transmitting signals to VCIB while VCIB is transmitting [Sleep].

3.5. APIs for Failure Notification

3.5.1. API List for Failure Notification
3.5.1.1. Inputs

TABLE 10

| Input APIs for Failure Notification | | |
|---|---|---|
| Signal Name | Description | Redundancy |
| N/A | N/A | N/A |

3.5.1.2. Outputs

TABLE 11

| Output APIs for Failure Notification | | |
|---|---|---|
| Signal Name | Description | Redundancy |
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of each API for Failure Notification
3.5.2.1. Request for ADS Operation

| | Values | |
|---|---|---|
| Value | Description | Remarks |
| 0 | No request | |
| 1 | Need maintenance | |
| 2 | Need to be back to garage | |
| 3 | Need to stop immediately | |
| Others | Reserved | |

Remarks
This signal shows a behavior which the ADS is expected to do according to a failure which happened in the VP.

3.5.2.2. Impact Detection Signal

| | Values | |
|---|---|---|
| Value | Description | Remarks |
| 0 | Normal | |
| 5 | Crash detection with activated airbag | |
| 6 | Crash detection with shut off high voltage circuit | |
| 7 | Invalid value | |
| Others | Reserved | |

Remarks
When the event of crash detection is generated, the signal is transmitted 50 consecutive times every 100 [ms]. If the crash detection state changes before the signal transmission is completed, the high signal of priority is tranmissted.
Priority: crash detection > normal
Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that data can be transmitted more than 5 times.

In this case, an instantaneous power interruption is taken into account.

3.5.2.3. Performance Deterioration of Brake System

| | Values | |
|---|---|---|
| Value | Description | Remarks |
| 0 | Normal | — |
| 1 | Deterioration detected | — |

Remarks
N/A

3.5.2.4. Performance Deterioration of Propulsion System

| | Values | |
|---|---|---|
| Value | Description | Remarks |
| 0 | Normal | — |
| 1 | Deterioration detected | — |

Remarks
N/A

3.5.2.5. Performance Deterioration of Shift Control System

| | Values | |
|---|---|---|
| Value | Description | Remarks |
| 0 | Normal | — |
| 1 | Deterioration detected | — |

Remarks
N/A

3.5.2.6. Performance Deterioration of Immobilization System

| | Values | |
|---|---|---|
| Value | Description | Remarks |
| 0 | Normal | — |
| 1 | Deterioration detected | — |

Remarks
N/A

3.5.2.7. Performance Deterioration of Steering System

| Values | | |
|---|---|---|
| Value | Description | Remarks |
| 0 | Normal | — |
| 1 | Deterioration detected | — |

Remarks
N/A

3.5.2.8. Performance Deterioration of Power Supply System

| Values | | |
|---|---|---|
| Value | Description | Remarks |
| 0 | Normal | — |
| 1 | Deterioration detected | — |

Remarks
N/A

3.5.2.9. Performance Deterioration of Communication System

| Values | | |
|---|---|---|
| Value | Description | Remarks |
| 0 | Normal | — |
| 1 | Deterioration detected | — |

Remarks
N/A

3.6. APIs for Security

3.6.1. API List for Security
3.6.1.1. Inputs

TABLE 12

| Input APIs for Security | | |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

| Output APIs for Security | | |
|---|---|---|
| Signal Name | Description | Redundancy |
| Door lock (1st left) status | Status of the current 1st-left door lock | N/A |
| Door lock (1st right) status | Status of the current 1st-right door lock | N/A |

TABLE 13-continued

| Output APIs for Security | | |
|---|---|---|
| Signal Name | Description | Redundancy |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security
3.6.2.1. Door Lock (Front) Command, Door Lock (Rear) Command

| Values | | |
|---|---|---|
| Value | Description | Remarks |
| 0 | No Request | |
| 1 | Lock | Not supported in Toyota VP |
| 2 | Unlock | |
| 3 | Reserved | |

Remarks
If ADK requests for unlocking front side, both front doors are unlocked.
If ADK requests for unlocking rear side, both 2nd row and trunk doors are unlocked.
If ADK requests for locking any door, it should use "Central door lock command."
(The functionality for individual locking is not supported in Toyota VP.)

3.6.2.2. Central Door Lock Command
Request to Control all Doors' Lock

| Values | | |
|---|---|---|
| Value | Description | Remarks |
| 0 | No Request | |
| 1 | Lock (all) | |
| 2 | Unlock (all) | |
| 3 | Reserved | |

Remarks
N/A 3.6.2.3. Device Authentication Signature the 1st Word, Device Authentication Signature the 2nd Word, Device Authentication Signature the 3rd Word, Device Authentication Signature the 4th Word, Device Authentication Seed the 1st Word, Device Authentication Seed the 2nd Word Device Authentication Signature the 1st word is presented in from 1st to 8th bytes of the signature.

Device Authentication Signature the 2nd word is presented in from 9th to 16th bytes of the signature.

Device Authentication Signature the 3rd word is presented in from 17th to 24th bytes of the signature.

Device Authentication Signature the 4th word is presented in from 25th to 32nd bytes of the signature.

Device Authentication Seed the 1st word is presented in from 1st to 8th bytes of the seed.

Device Authentication Seed the 2nd word is presented in from 9th to 16th bytes of the seed.

3.6.2.4. Door Lock (1st Left) Status

| Values | | |
|---|---|---|
| Value | Description | Remarks |
| 0 | Reserved | |
| 1 | Locked | |
| 2 | Unlocked | |
| 3 | Invalid | |

Remarks
N/A 3.6.2.5. Door Lock (1st Right) Status

| Values | | |
|---|---|---|
| Value | Description | Remarks |
| 0 | Reserved | |
| 1 | Locked | |
| 2 | Unlocked | |
| 3 | Invalid | |

Remarks
N/A 3.6.2.6. Door Lock (2nd Left) Status

| Values | | |
|---|---|---|
| Value | Description | Remarks |
| 0 | Reserved | |
| 1 | Locked | |
| 2 | Unlocked | |
| 3 | Invalid | |

Remarks
N/A 3.6.2.7. Door Lock (2nd Right) Status

| Values | | |
|---|---|---|
| Value | Description | Remarks |
| 0 | Reserved | |
| 1 | Locked | |
| 2 | Unlocked | |
| 3 | Invalid | |

Remarks
N/A 3.6.2.8. Door Lock Status of all Doors

| Values | | |
|---|---|---|
| Value | Description | Remarks |
| 0 | Reserved | |
| 1 | All Locked | |
| 2 | Anything Unlocked | |
| 3 | Invalid | |

Remarks
In case any doors are unlocked, "Anything Unlocked."
In case all doors are locked, "All Locked."

3.6.2.9. Alarm System Status

| Values | | |
|---|---|---|
| Value | Description | Remarks |
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks
N/A 3.6.2.9.1. Trip Counter

This counter is incremented in a unit of trips by the Freshness Value management master ECU.

Values
  0—FFFFh

Remarks
  This value is used to create a Freshness value.
  For details, please refer to the other material [the specification of Toyota's MAC module].

3.6.2.9.2. Reset Counter

This counter is incremented periodically by the Freshness Value management master ECU.

Values
  0—FFFFFh

Remarks
  This value is used to create a Freshness value.
  For details, please refer to the other material [the specification of Toyota's MAC module].

3.6.2.10. 1st Left Door Open Status

Status of the current 1st-left door open/close of the vehicle platform

| Values | | |
|---|---|---|
| Value | Description | Remarks |
| 0 | Reserved | |
| 1 | Open | |
| 2 | Closes | |
| 3 | Invalid | |

Remarks
N/A 3.6.2.11. 1st Right Door Open Status
Status of the Current 1st-Right Door Open/Close

| Values | | |
|---|---|---|
| Value | Description | Remarks |
| 0 | Reserved | |
| 1 | Open | |

-continued

| Values | | |
|---|---|---|
| Value | Description | Remarks |
| 2 | Close | |
| 3 | Invalid | |

Remarks
N/A

3.6.2.12. 2nd Left Door Open Status
Status of the Current 2nd-Left Door Open/Close

| Values | | |
|---|---|---|
| Value | Description | Remarks |
| 0 | Reserved | |
| 1 | Open | |
| 2 | Close | |
| 3 | Invalid | |

Remarks
N/A

3.6.2.13. 2nd Right Door Open Status
Status of the Current 2nd-Right Door Open/Close

| Values | | |
|---|---|---|
| Value | Description | Remarks |
| 0 | Reserved | |
| 1 | Open | |
| 2 | Close | |
| 3 | Invalid | |

Remarks
N/A

3.6.2.14. Trunk Status
Status of the Current Trunk Door Open/Close

| Values | | |
|---|---|---|
| Value | Description | Remarks |
| 0 | Reserved | |
| 1 | Open | |
| 2 | Close | |
| 3 | Invalid | |

Remarks
N/A

3.6.2.15. Hood Open Status
Status of the Current Hood Open/Close

| Values | | |
|---|---|---|
| Value | Description | Remarks |
| 0 | Reserved | |
| 1 | Open | |
| 2 | Close | |
| 3 | Invalid | |

Remarks
N/A

4. API GUIDES TO CONTROL TOYOTA VEHICLES

This section shows in detail the way of using APIs for Toyota vehicles.

4.1. APIs for Vehicle Motion Control 4.1.1. API List for Vehicle Motion Control Input and output APIs for vehicle motion control are shown in Table 14 and Table 15, respectively. Usage guides of some APIs are presented in the following sections as indicated in each table.

4.1.1.1. Inputs

TABLE 14

Input APIs for Vehicle Motion Control

| Signal Name | Description | Redundancy | Usage Guide |
|---|---|---|---|
| Propulsion Direction Command | Request for shift change from/to forward (D range) to/from back (R range) | N/A | 4.1.2.1 |
| Immobilization Command | Request for turning on/off WheelLock | Applied | 4.1.2.2 |
| Standstill Command | Request for keeping on/off stationary | Applied | 4.1.2.3 |
| Acceleration Command | Request for acceleration/deceleration | Applied | 4.1.2.1 4.1.2.2 4.1.2.3 4.1.2.4 |
| Front Wheel Steer Angle Command | Request for front wheel steer angle | Applied | 4.1.2.5 |
| Vehicle Mode Command | Request for changing from/to manual mode to/from Autonomous Mode | Applied | 4.1.2.6 |
| High Dynamics Command | Request for increasing braking response performance* | Applied | — |

*Reaction time in VP upon a request from ADK 4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e g. EPB and Shift P) | Applied | 4.1.2.2 4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |

TABLE 15-continued

Output APIs for Vehicle Motion Control

| Signal Name | Description | Redundancy | Usage Guide |
|---|---|---|---|
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (rear right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1 4.1.2.3 |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API guides in Details for Vehicle Motion Control 4.1.2.1. Propulsion Direction Command Please refer to 3.2.2.1 for value and remarks in detail.

Figure 15:
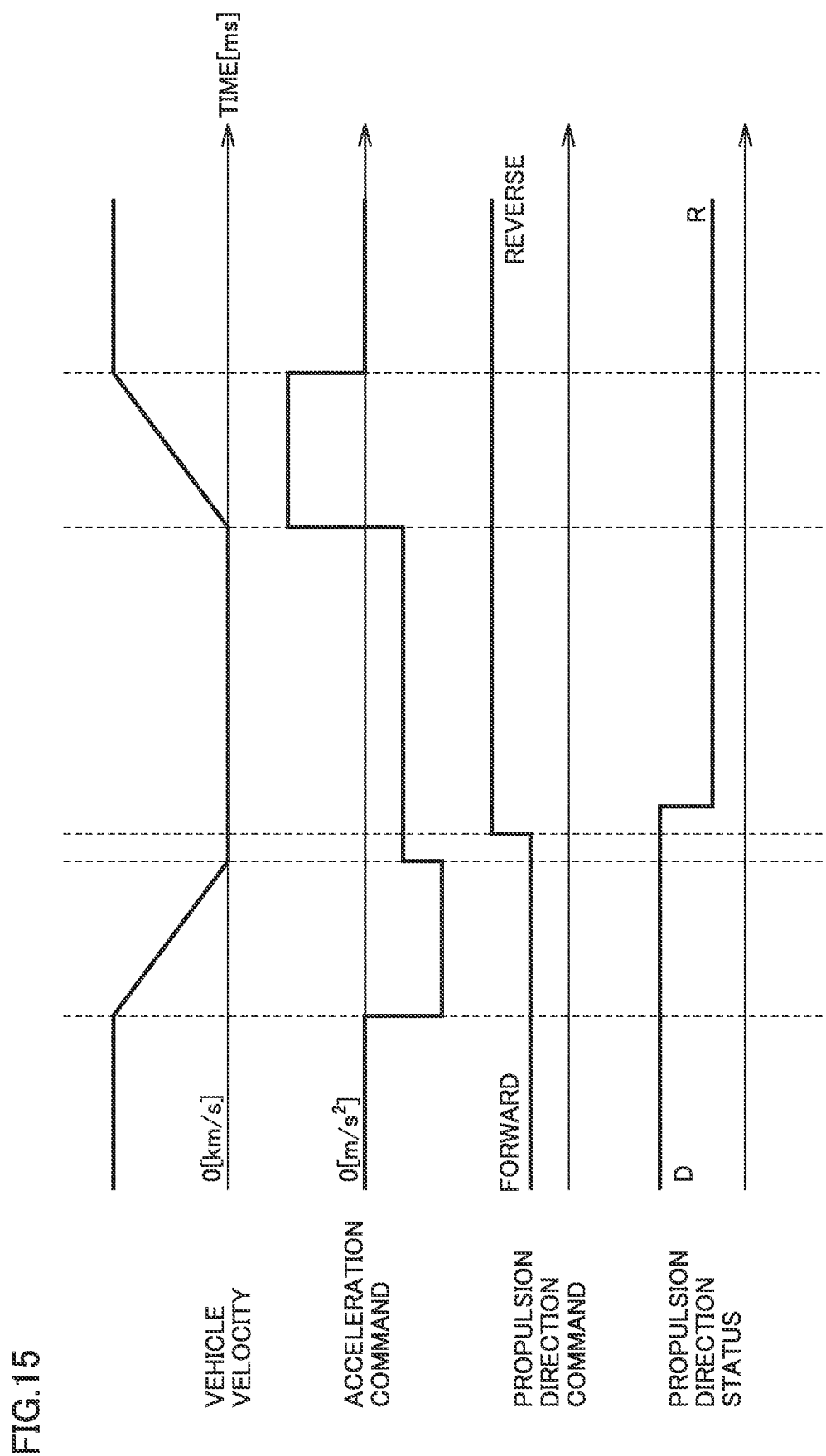
FIG. 15 is a diagram showing details of shift change sequences.

FIG. 15 shows shift change sequences in detail.

First deceleration is requested by Acceleration Command and the vehicle is stopped. When Traveling direction is set to "standstill", any shift position can be requested by Propulsion Direction Command. (In FIG. 15, "D" "R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

Figure 16:
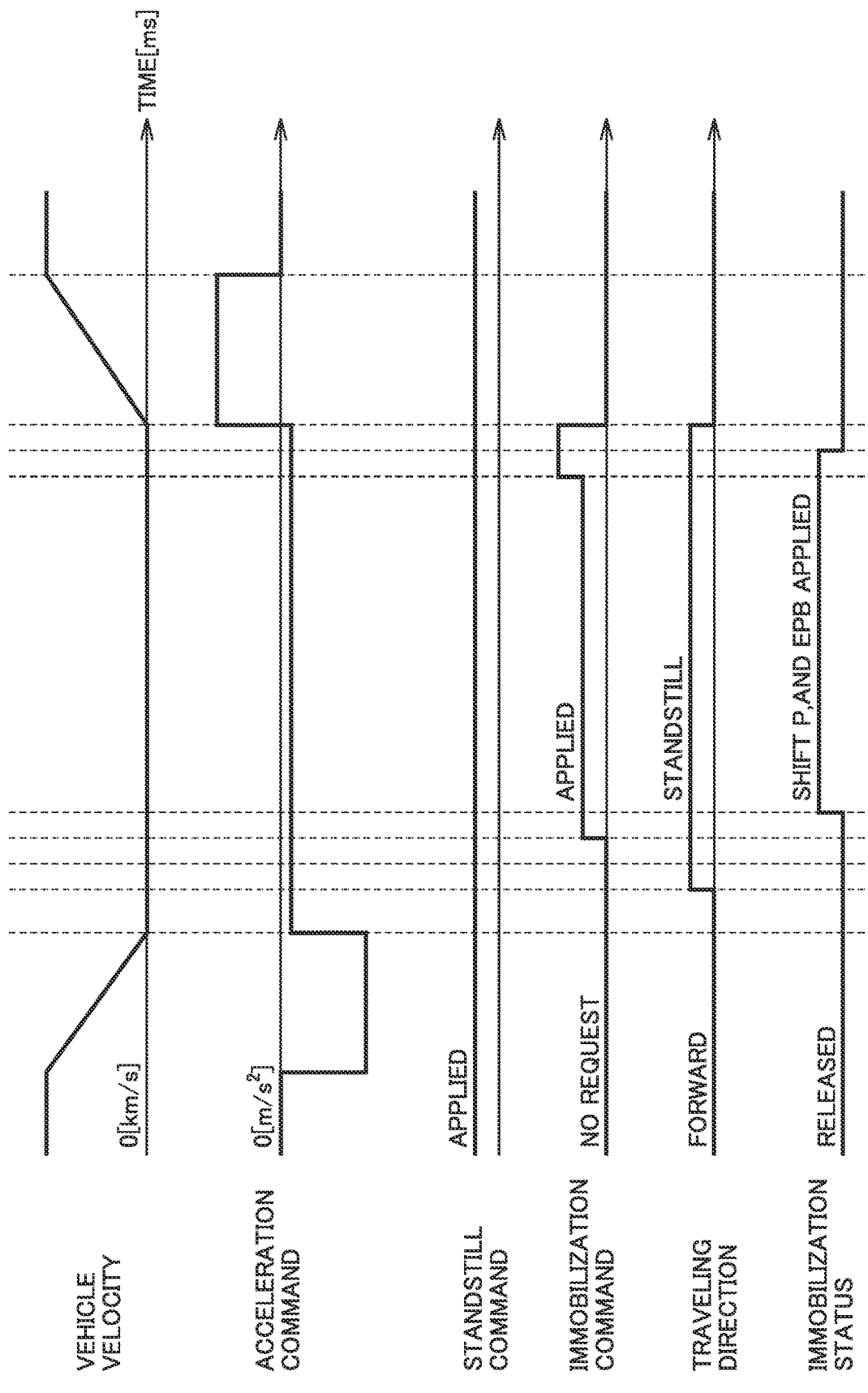
FIG. 16 is a diagram showing immobilization sequences.

FIG. 16 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied". On the other hand, in case where Standstill Command is set as "Released", brakehold function is deactivated.

Figure 17:
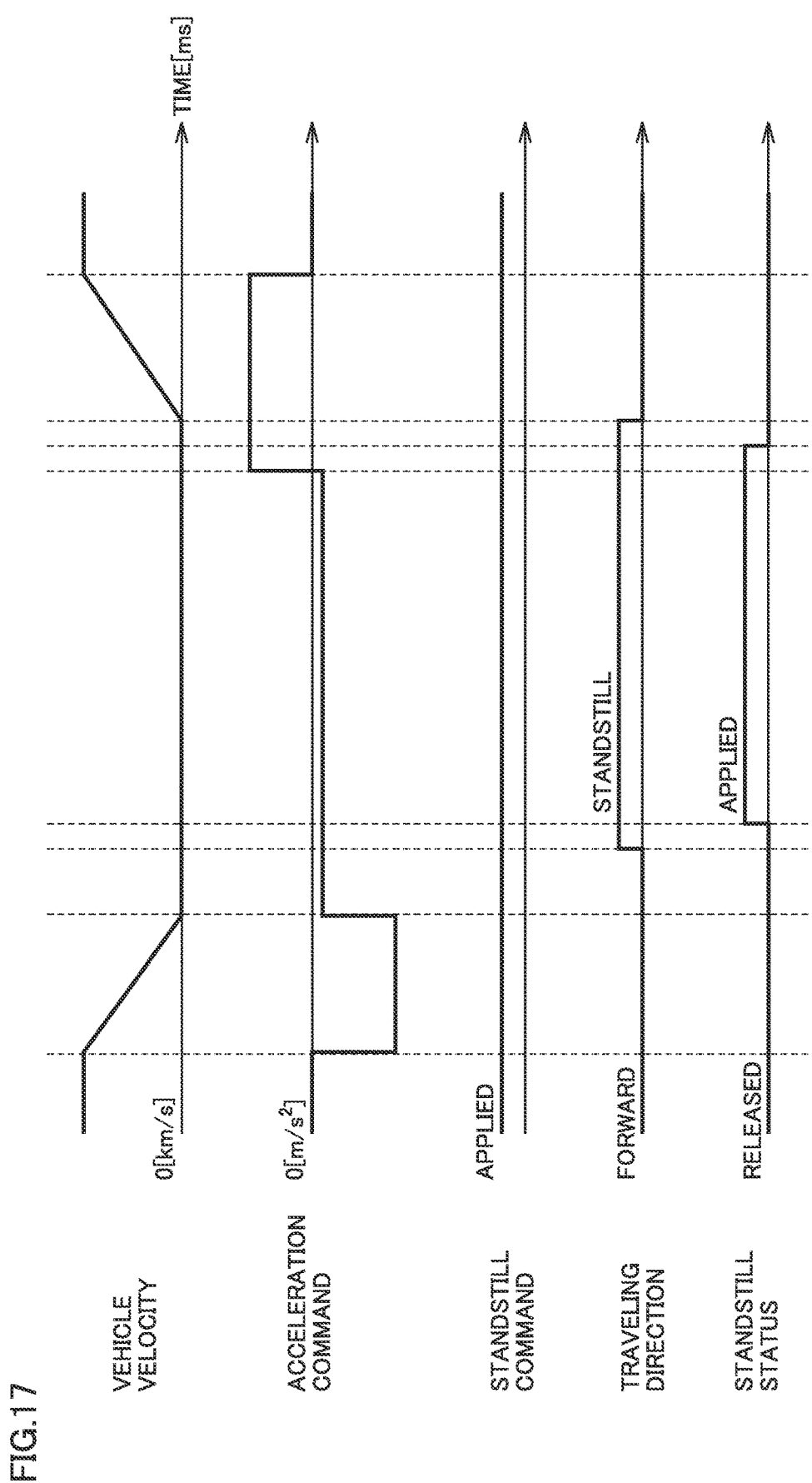
FIG. 17 is a diagram showing standstill sequences.

FIG. 17 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1[rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

Figure 18:
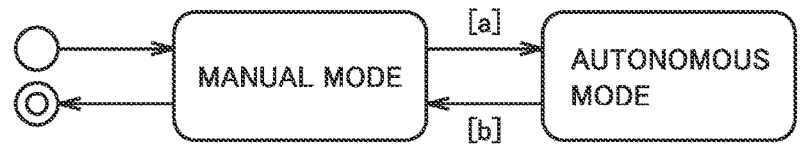
FIG. 18 is a state machine diagram of an autonomy state.

The state machine of mode transition for Autono-MaaS vehicle is shown in FIG. 18.

The explanation of each state is shown as follows.

| State | Description |
|---|---|
| Manual | A vehicle begins with this state and is under a control of a human driver. ADK cannot give any controls (except some commands) to VP. Power mode status and Vehicle mode state are in the followings: Power mode status = Wake or Drive Vehicle mode state = Manual Mode |
| Autonomy | ADK can communicate to VP after authentication is successful. VP is under the control of the ADK as a result of being issued "Request for Autonomy." Power mode status and Vehicle mode state are in the followings: Power mode status - Drive Vehicle mode state = Autonomous Mode |

The explanation of each transition is shown as follows.

| Transition | Conditions |
|---|---|
| a | When the following conditions are established, the mode will be transitioned from Manual to Autonomy: The ADK is authenticated, Power mode status = Drive, Readiness for autonomization = Ready For Autonomy Vehicle Mode Command = Request For Autonomy. |
| b | When the following conditions are established, the mode will be transitioned from Autonomy to Manual: Vehicle Mode Command = Deactivation Request. |

4.2. APIs for BODY Control

4.2.1. API List for BODY Control

4.2.1.1. Inputs

TABLE 16

Input APIs for BODY Control

| Signal Name | Description | Redundancy | Usage Guide |
|---|---|---|---|
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |

TABLE 16-continued

Input APIs for BODY Control

| Signal Name | Description | Redundancy | Usage Guide |
|---|---|---|---|
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

Output APIs for BODY Control

| Signal Name | Description | Redundancy | Usage Guide |
|---|---|---|---|
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the $1^{st}$ row HVAC | N/A | — |
| HVAC (2nd row) status | Status of activation of the $2^{nd}$ row HVAC | N/A | — |
| Target temperature (1st left) status | Status of set temperature of $1^{st}$ row left | N/A | — |
| Target temperature (1st right) status | Status of set temperature of $1^{st}$ row right | N/A | — |
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |

TABLE 17-continued

Output APIs for BODY Control

| Signal Name | Description | Redundancy | Usage Guide |
|---|---|---|---|
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control

4.3.1. API List for Power Control
4.3.1.1. Inputs

TABLE 18

Input APIs for Power Control

| Signal Name | Description | Redundancy | Usage Guide |
|---|---|---|---|
| Power mode command | Command to control the power mode of VP | N/A | — |

4.3.1.2. Outputs

TABLE 19

Output APIs for Power Control

| Signal Name | Description | Redundancy | Usage Guide |
|---|---|---|---|
| Power mode status | Status of the current power mode of VP | N/A | — |

4.4. APIs for Failure Notification

4.4.1. API List for Failure Notification
4.4.1.1. Inputs

TABLE 20

Input APIs for Failure Notification

| Signal Name | Description | Redundancy | Usage guide |
|---|---|---|---|
| N/A | — | — | — |

4.4.1.2. Outputs

TABLE 21

Output APIs for Failure Notification

| Signal Name | Description | Redundancy | Usage guide |
|---|---|---|---|
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |
| Performance deterioration of Immobilization system | — | Applied | — |
| Performance deterioration of Steering system | — | Applied | — |
| Performance deterioration of Power supply system | — | Applied | — |
| Performance deterioration of Communication system | — | Applied | — |

4.5. APIs for Security

4.5.1. API List for Security

Input and output APIs for Security are shown in Table 22 and Table 23, respectively. Usage guides of some APIs are presented in the following sections as indicated in each table.

4.5.1.1. Inputs

TABLE 22

Input APIs for Security

| Signal Name | Description | Redundancy | Usage Guide |
|---|---|---|---|
| Door Lock (front) command | Command to control 1st both doors lock | N/A | — |
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

Output APIs for Security

| Signal Name | Description | Redundancy | Usage Guide |
|---|---|---|---|
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API guides in Details for Security 4.5.2.1. Device Authentication Protocol Device authentication is applied when the VCIB is activated from "Sleep" mode.

After the authentication succeeds, the VCIB can start to communicate with ADK.

Figure 19:
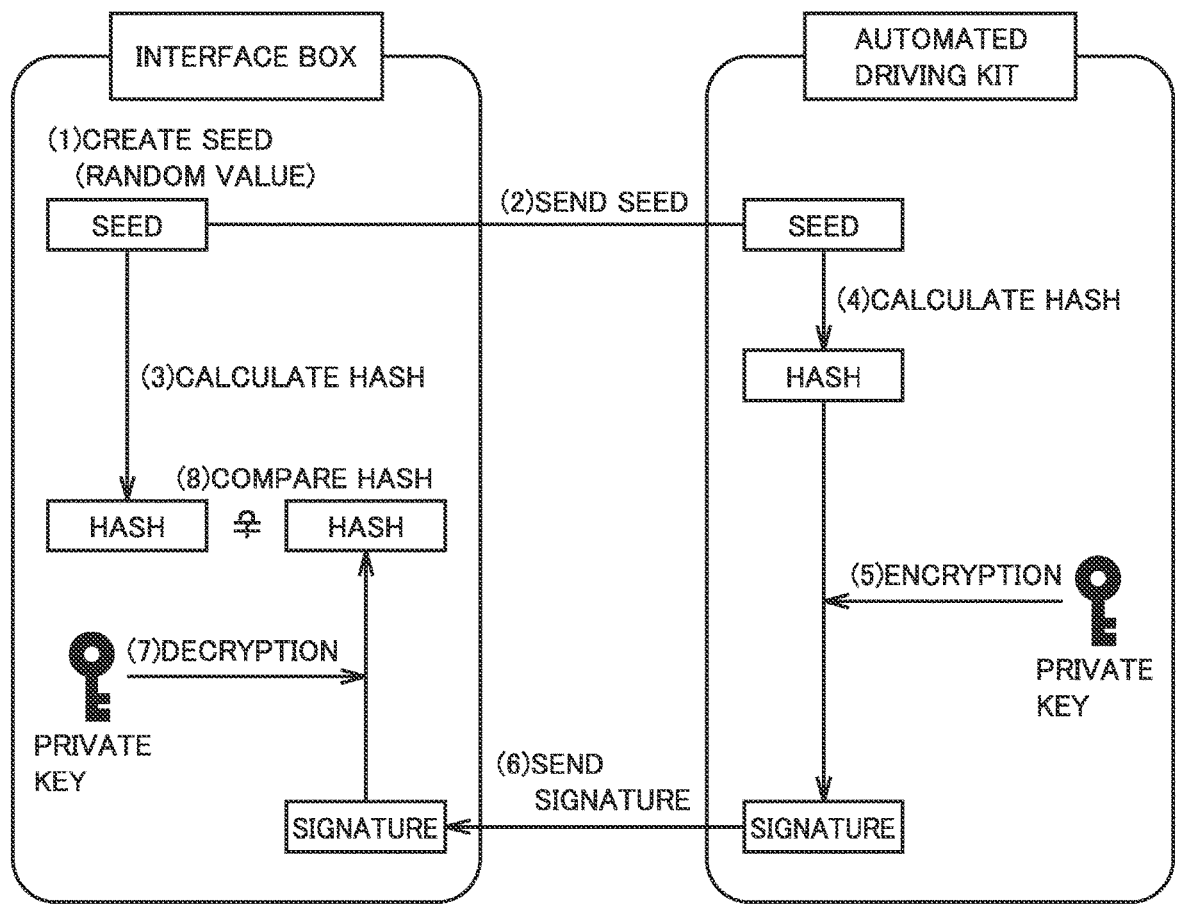
FIG. 19 is a diagram showing an authentication process.

Authentication process is as shown in FIG. 19 Authentication Process.

| Authentication Specification | | |
|---|---|---|
| Item | Specification | Note |
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An autonomous driving system (ADS) mountable on a vehicle, the vehicle including a vehicle platform (VP) that controls the vehicle in accordance with a control request from the ADS, the VP including an electric parking brake system that switches between activation and release of brakehold and a vehicle control interface that interfaces between the ADS and the VP, the vehicle control interface providing a standstill status signal to the ADS, the standstill status signal including a first value, indicating activation of the brakehold, and a second value, indicating release of the brakehold, the ADS comprising:

a compute assembly; and a communication module that communicates with the vehicle control interface, wherein the compute assembly is configured to;

create a driving plan of the vehicle, generate control requests in accordance with the driving plan, the control requests including a standstill command, and output the standstill command to the VP, the standstill command including a third value, indicating allowing the brakehold and requesting to apply the brakehold, or a fourth value, indicating not allowing the brakehold, when the compute assembly outputs the standstill command including the third value, the compute assembly requests the VP to decelerate, and in response to the standstill status signal switching from the second value to the first value, the compute assembly continues to request the VP to decelerate during an entire period for which the brakehold is active.

2. The ADS according to claim 1, wherein
when the standstill status signal has been set to the first value, the compute assembly causes the VP to switch the standstill status signal from the first value to the second value by requesting the VP to accelerate.

3. A vehicle comprising the ADS according to claim 1.

4. A vehicle control interface that interfaces between an autonomous driving system (ADS) and a vehicle platform (VP) that controls a vehicle in accordance with a control request from the ADS, the VP including an electric parking brake system that switches between activation and release of brakehold, the vehicle control interface comprising:
   a processor; and
   a memory in which a program executable by the processor is stored, wherein
   the processor is configured to:
      provide the ADS with a standstill status signal including a first value indicating activation of the brakehold and a second value indicating release of the brakehold, and
      receive, from the ADS, a standstill command, the standstill command being generated by the ADS in accordance with a driving plan created by the ADS, the standstill command including a third value, indicating allowing the brakehold and requesting to apply the brakehold, or a fourth value, indicating not allowing the brakehold,
      receive, when the ADS outputs the standstill command including the third value, a request for the VP to decelerate, and
      in response to the standstill status signal switching from the second value to the first value, the processor continues to receive requests from the ADS to decelerate during an entire period for which the brakehold is active.

5. The vehicle control interface according to claim 4, wherein
when the standstill status signal has been set to the first value, the processor switches the standstill status signal from the first value to the second value in response to an acceleration request from the ADS.

6. A vehicle comprising the vehicle control interface according to claim 4.

7. The vehicle according to claim 6, further comprising the ADS.

* * * * *